(12) United States Patent
Ukai et al.

(10) Patent No.: US 7,424,483 B2
(45) Date of Patent: Sep. 9, 2008

(54) LOCATION INFORMATION RECOMMENDING APPARATUS, METHOD, AND STORAGE MEDIUM

(75) Inventors: Takanori Ukai, Kawasaki (JP); Kazuo Misue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 10/277,819

(22) Filed: Oct. 23, 2002

(65) Prior Publication Data

US 2003/0182295 A1  Sep. 25, 2003

(30) Foreign Application Priority Data

Mar. 20, 2002  (JP) .............................. 2002-078830

(51) Int. Cl.
*G06F 17/00* (2006.01)

(52) U.S. Cl. ............................ 707/102; 707/5; 715/206

(58) Field of Classification Search ............. 707/1, 707/6, 10, 100, 102, 104.1, 200, 5, 2, 3; 709/224; 705/513; 715/205, 206, 234, 239

See application file for complete search history.

(56) References Cited

U.S. PATENT DOCUMENTS

| | | | | |
|---|---|---|---|---|
| 5,890,172 | A * | 3/1999 | Borman et al. ........... | 715/501.1 |
| 6,032,162 | A * | 2/2000 | Burke ...................... | 715/501.1 |
| 6,178,419 | B1 * | 1/2001 | Legh-Smith et al. ......... | 707/6 |
| 6,208,995 | B1 * | 3/2001 | Himmel et al. .......... | 707/104.1 |
| 6,212,522 | B1 * | 4/2001 | Himmel et al. ............... | 707/10 |
| 6,216,134 | B1 * | 4/2001 | Heckerman et al. ...... | 707/104.1 |
| 6,275,862 | B1 * | 8/2001 | Sharma et al. ............. | 709/245 |
| 6,393,462 | B1 * | 5/2002 | Mullen-Schultz .......... | 709/206 |
| 6,408,316 | B1 * | 6/2002 | Himmel et al. .......... | 715/501.1 |
| 6,415,368 | B1 * | 7/2002 | Glance et al. .............. | 711/158 |
| 6,493,702 | B1 * | 12/2002 | Adar et al. ..................... | 707/3 |
| 6,546,393 | B1 * | 4/2003 | Khan .......................... | 707/10 |
| 6,684,218 | B1 * | 1/2004 | Santos et al. ................ | 707/102 |
| 6,725,227 | B1 * | 4/2004 | Li .............................. | 707/102 |
| 6,832,350 | B1 * | 12/2004 | Bates et al. .............. | 715/501.1 |
| 7,007,008 | B2 * | 2/2006 | Goel et al. ..................... | 707/3 |
| 2002/0016786 | A1 * | 2/2002 | Pitkow et al. .................. | 707/3 |
| 2002/0035643 | A1 * | 3/2002 | Morita ....................... | 709/245 |

(Continued)

FOREIGN PATENT DOCUMENTS

JP  10-143519  5/1998

(Continued)

OTHER PUBLICATIONS

Y. Kato et al., "Clustering Based on Structure of Document", MYCOM 2001, May 21, 2001, pp. 17-22.

(Continued)

*Primary Examiner*—Greta L Robinson
(74) *Attorney, Agent, or Firm*—Staas & Halsey LLP

(57) ABSTRACT

A category pair is generated in a round-robin fashion for all of categories by obtaining each category of a document directory, each category of a bookmark, and a URL registered to each category from each of a document directory storing unit and a bookmark storing unit, and the degree of similarity is calculated for each category pair. Next, a pair of categories whose degrees of association are high is selected from among all of category pairs, and a URL candidate to be recommended each other is extracted for each selected category pair.

30 Claims, 21 Drawing Sheets

U.S. PATENT DOCUMENTS

| | | | |
|---|---|---|---|
| 2002/0184095 A1* | 12/2002 | Scullard et al. | 705/14 |
| 2002/0186239 A1* | 12/2002 | Komuro | 345/738 |
| 2002/0198882 A1* | 12/2002 | Linden et al. | 707/10 |
| 2003/0014399 A1* | 1/2003 | Hansen et al. | 707/3 |
| 2003/0046357 A1* | 3/2003 | Doyle et al. | 709/214 |
| 2003/0052918 A1* | 3/2003 | Drane et al. | 345/764 |
| 2003/0080986 A1* | 5/2003 | Baird | 345/700 |

FOREIGN PATENT DOCUMENTS

| | | |
|---|---|---|
| JP | 2000-207410 | 7/2000 |

OTHER PUBLICATIONS

T. Ukai et al., "5C-01: Use of Automatic Acquiring and Automatic Classification for Document Directory Maintenance", The 62$^{nd}$ IPSJ Annual Conference, Mar. 13, 2001.

Rucker, James, et al., "Siteseer: Personalized Navigation for the Web", Communications of the ACM, Mar. 1997, vol. 40, No. 3, pp. 73-75.

Hamasaki, Masahiro, et al., "kMedia: Discovery of Shared Topic Networks among Users by using WWW Bookmarks", Technical Report of IEICE, Japan, The Institute of Electronics, Information, and Communication Engineers, Mar. 12, 2001, vol. 100, No. 709, pp. 65-72.

* cited by examiner

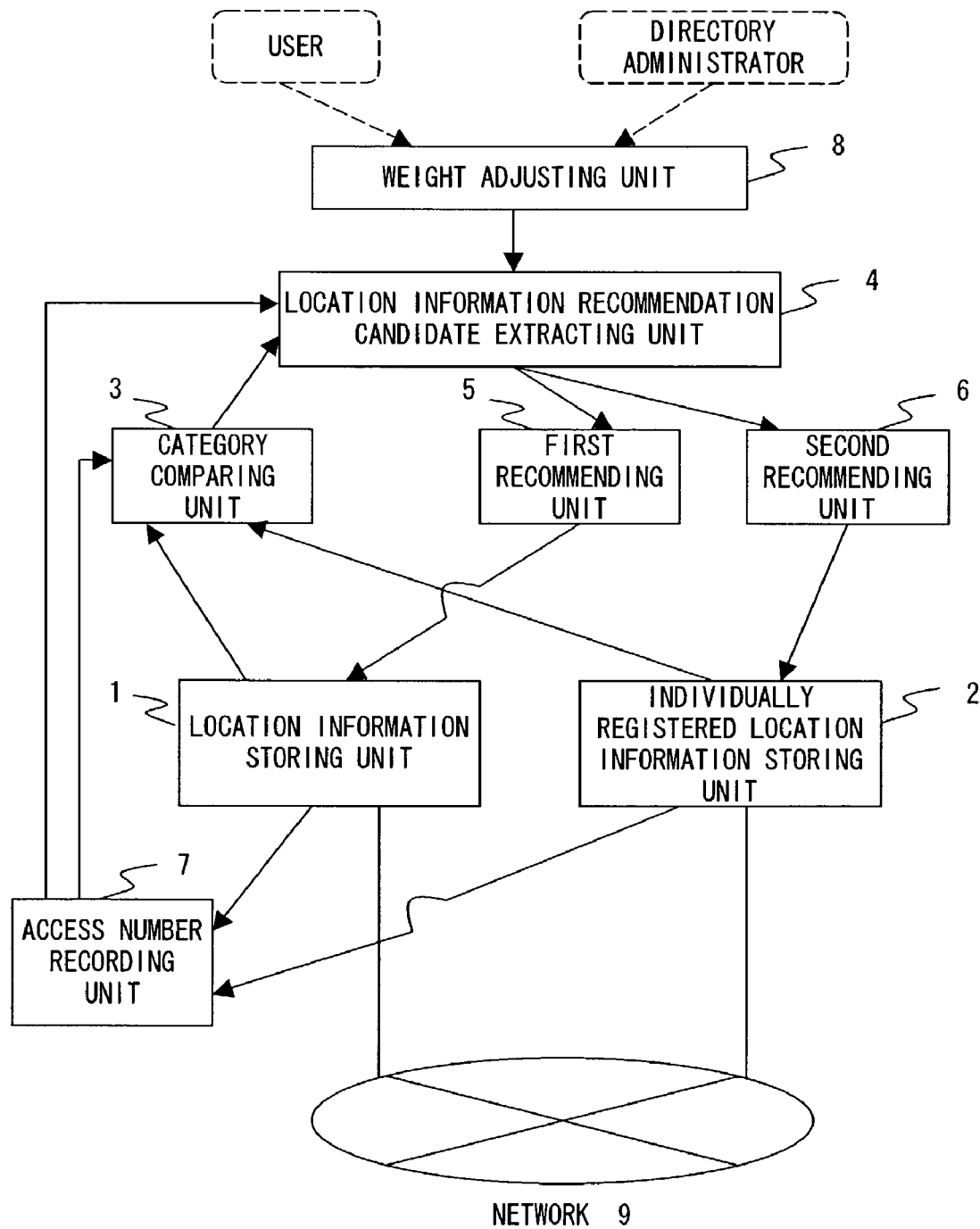
F I G. 1

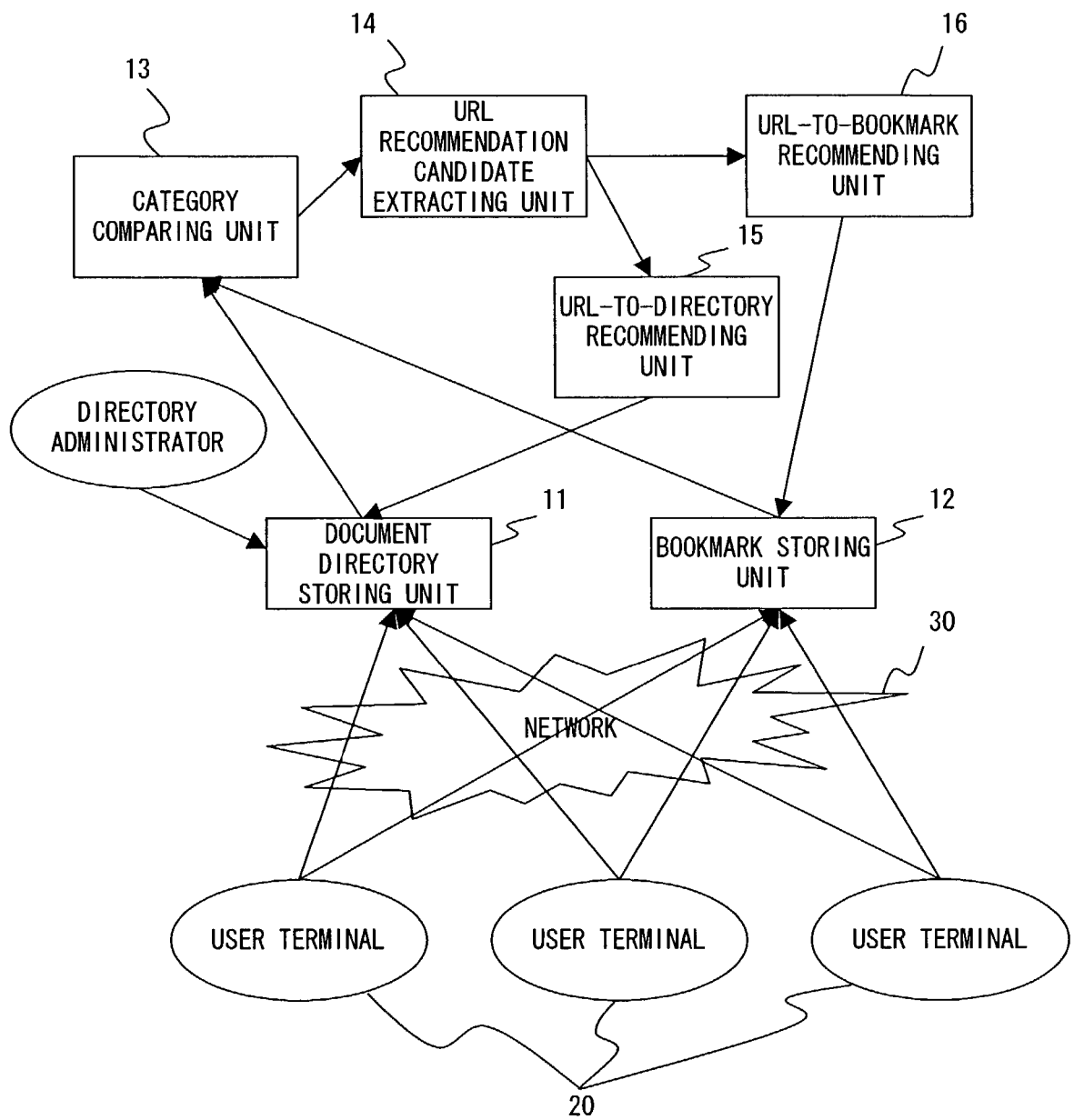
F I G. 2

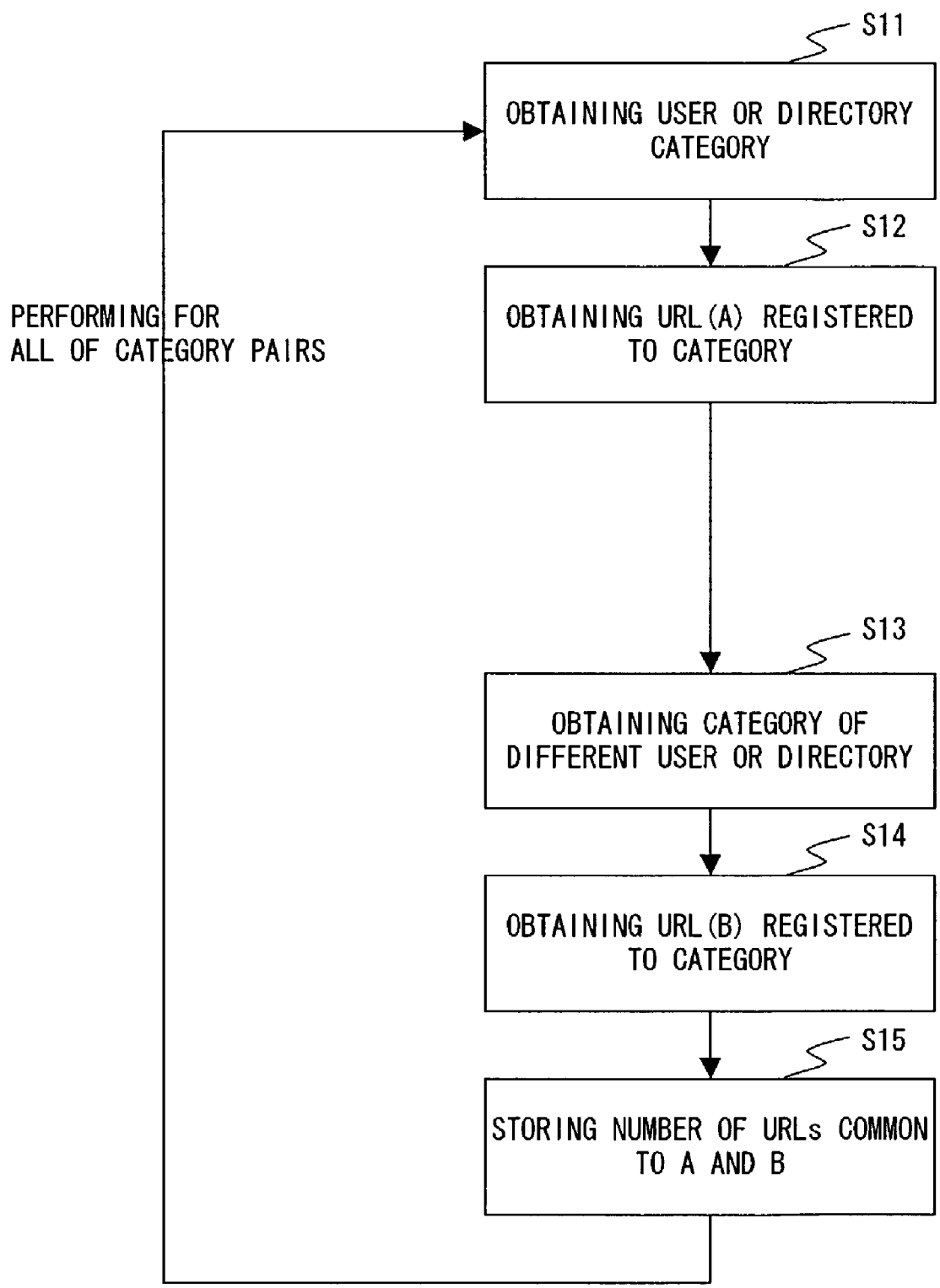
F I G. 5

FIG. 7A

```
... (C, URL1)
    (C, URL2)
    (C, URL3)
    (D, URL4)
    (D, URL5)
    (E, URL6)
    (E, URL7)
    (E, URL8) ....
```

FIG. 7B

```
... (a1, URL1)
    (a1, URL3)
    (a1, URL10)
    (a2, URL7)
    (a2, URL11)
    (b1, URL1)
    (b1, URL12) ...
```

FIG. 7C

| CATEGORY NAME (61) | CATEGORY NAME (62) | DEGREE OF SIMILARITY (63) |
|---|---|---|
| C | a1 | 2 |
| C | a2 | 0 |
| C | b1 | 1 |
| D | a1 | 0 |
| a1 | b1 | 1 |
| ... | ... | ... |

| CATEGORY\URL | URL1 | URL2 | URL3 | URL4 | URL5 | URL6 | URL7 | URL8 | URL9 | URL10 | URL11 | URL12 | URL13 | ... | URLn |
|---|---|---|---|---|---|---|---|---|---|---|---|---|---|---|---|
| a1 | 1 | 0 | 1 | 0 | 0 | 0 | 0 | 0 | 0 | 1 | 0 | 0 | | ... | |
| a2 | 0 | 0 | 0 | 0 | 0 | 0 | 1 | 0 | 0 | 0 | 0 | 1 | 0 | ... | |
| b1 | 1 | 0 | 0 | 0 | 0 | 0 | 0 | 0 | 0 | 0 | 1 | 0 | 0 | | |
| b2 | | | | | | | | | | | | | | | |
| b3 | | | | | | | | | | | | | | | |
| c1 | | | | | | | | | | | | | | | |
| C | 1 | 1 | 1 | 0 | 1 | 0 | 0 | 0 | 0 | | | | | ... | |
| D | 0 | 0 | 0 | 1 | 0 | 1 | 0 | 0 | 0 | | | | | ... | |
| E | 0 | 0 | 0 | 0 | 0 | 1 | 1 | 1 | 0 | | | | | ... | |
| F | . . . . | | | | | | | | | | | | | | |

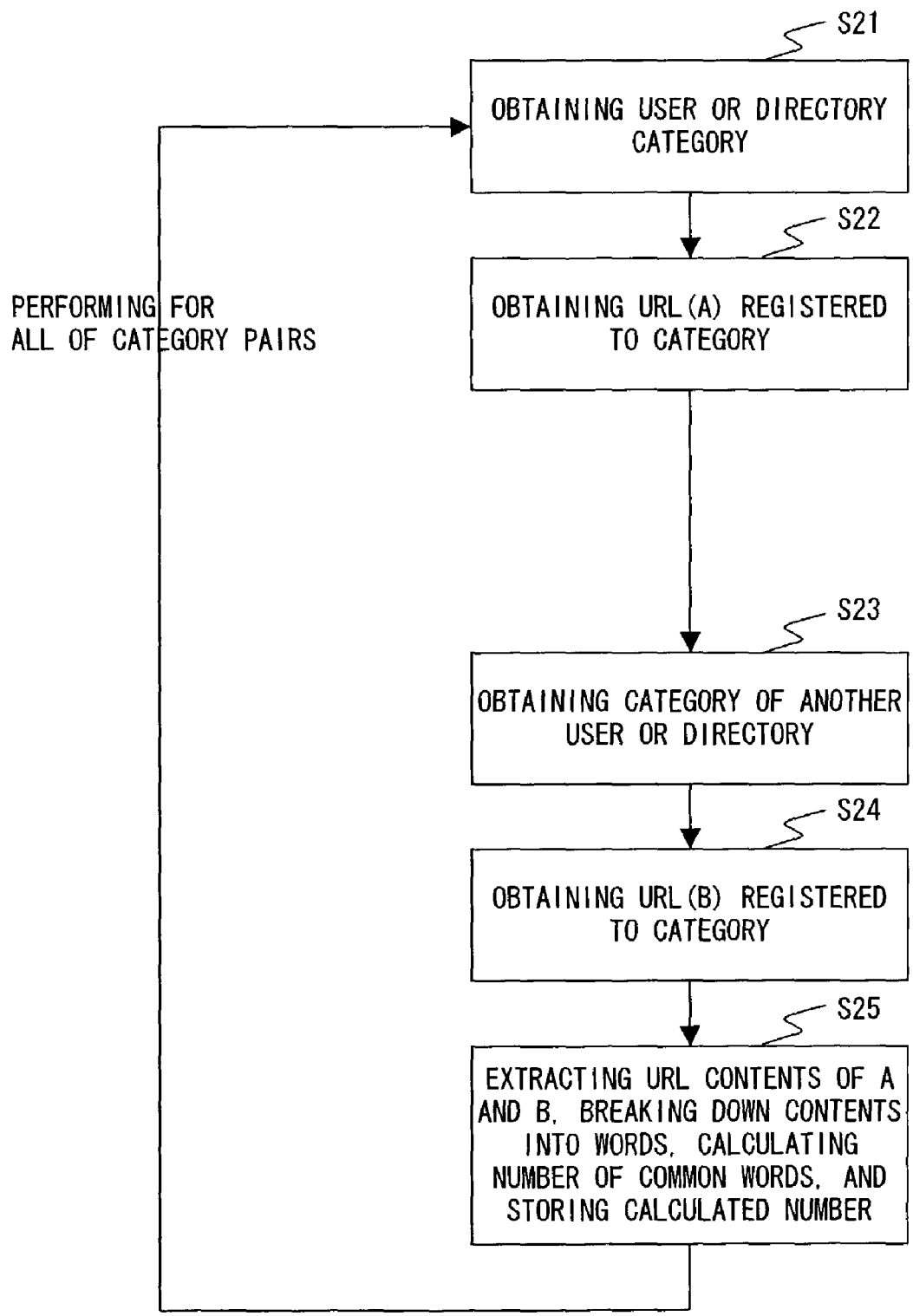
F I G. 9

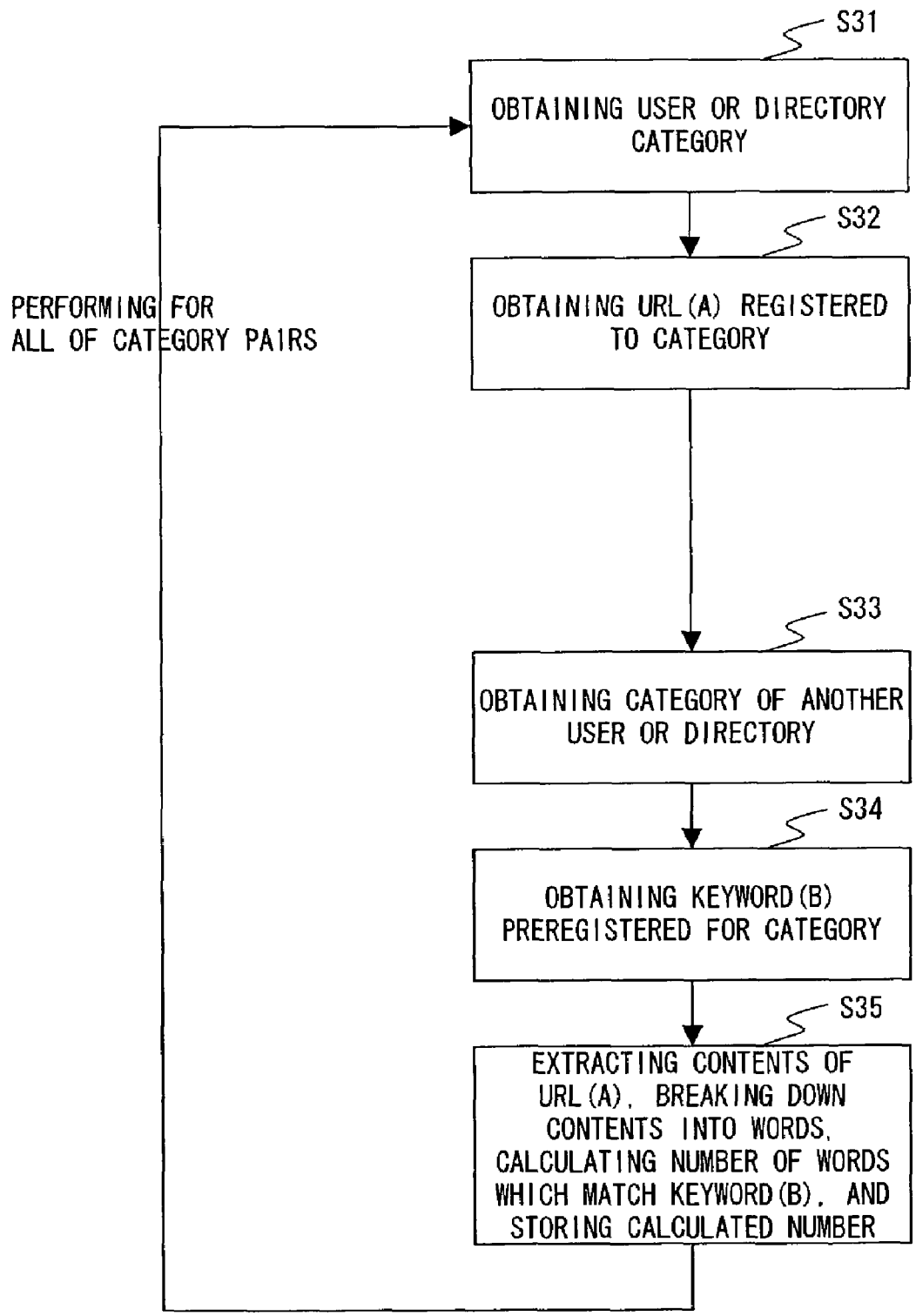
F I G. 1 0

FIG. 13A

```
(C, URL1)        (URL1, 1000)
(C, URL2)        (URL2, 10000)
(C, URL9)        (URL3, 7000)
(D, URL3)        (URL4, 3000)
(F, URL4)        (URL5, 2000)
(H, URL5)        (URL6, 10000)
(H, URL6)        (URL7, 9000)
(H, URL7)        (URL8, 2000)
(H, URL8)        (URL9, 7000)
```

FIG. 13B

```
(a1, URL1)       (URL1, 2)
(a1, URL2)       (URL2, 8)
(a2, URL3)       (URL3, 3)
(a3, URL5)       (URL5, 5)
(a3, URL6)       (URL6, 8)
(a3, URL7)       (URL7, 3)
(a3, URL10)      (URL10, 2)
```

FIG. 13C

| CATEGORY NAME | CATEGORY NAME | DEGREE OF SIMILARITY |
|---|---|---|
| C | a1 | 2 |
| C | a1 | 1 |
| D | a2 | 1 |
| F | a3 | 0 |
| H | a3 | 3 |
| ⋮ | ⋮ | ⋮ |

FIG. 13D

| CATEGORY NAME | CATEGORY NAME | DIFFERENCE URL |
|---|---|---|
| C | a1 | URL9 |
| H | a3 | URL8, URL10 |

| URL CATEGORY | URL1 | URL2 | URL3 | URL4 | URL5 | ...... | ... | URLn |
|---|---|---|---|---|---|---|---|---|
| a1 | 0 | 0 | 1 | 0 | 1 | | | |
| a2 | 1 | 0 | 0 | 0 | 0 | | | |
| b1 | 0 | 0 | 0 | 1 | 1 | | | |
| b2 | 1 | 0 | 0 | 1 | 1 | | | |
| c1 | 0 | 1 | 0 | 0 | 1 | | | |
| d1 | 1 | 0 | 0 | 1 | 0 | | | |
| e1 | 0 | 0 | 1 | 1 | 1 | | | |
| ⋮ | | | | | | | | |
| C | 0 | 1 | 1 | 1 | 1 | ...... | | |
| D | 0 | 0 | 0 | 0 | 0 | ...... | | |
| E | 0 | 0 | 0 | 0 | 0 | ...... | | |
| F ⋮ | | | | | | | | |

100

F I G. 1 6

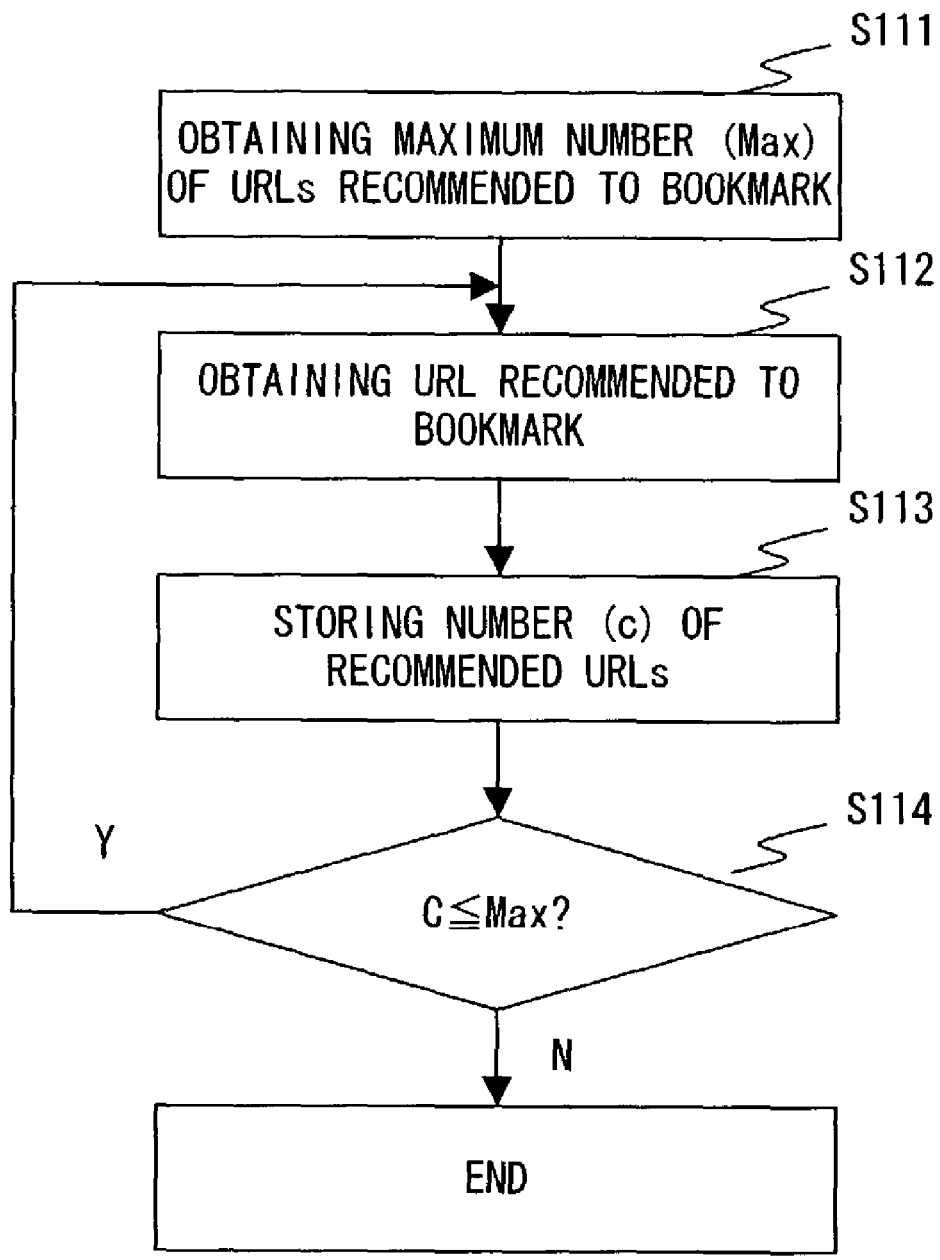
F I G. 1 9

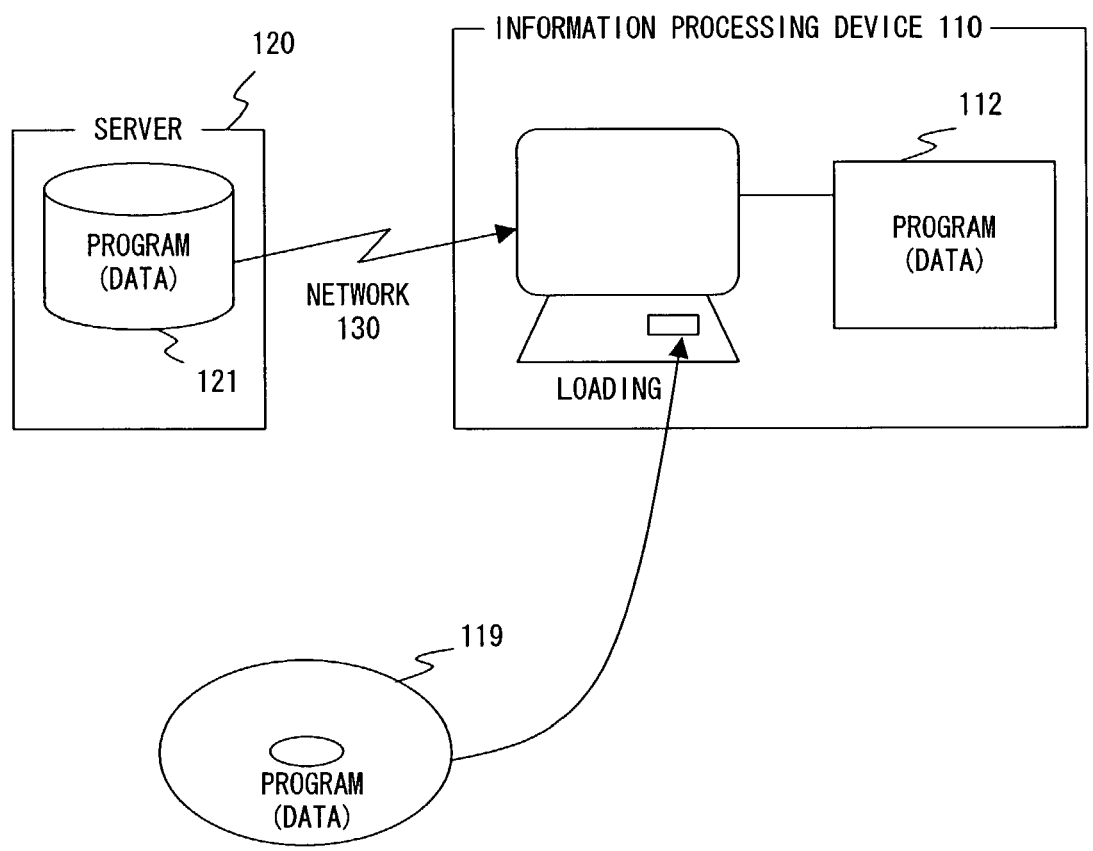
F I G. 2 1

LOCATION INFORMATION RECOMMENDING APPARATUS, METHOD, AND STORAGE MEDIUM

BACKGROUND OF THE INVENTION

1. Field of the Invention

The present invention relates to an apparatus and method assisting the administration of location information such as a URL, etc.

2. Description of the Related Art

Conventionally, most Internet users use a function for registering a URL (Uniform Resource Locator) of their favorite site, or a particular Web page that they frequently access, and for facilitating an access next time. Such a function is called a "bookmark", "favorites", etc. Hereinafter, the "bookmark" is taken as an example.

Incidentally, a URL varies very frequently, and becomes obsolete shortly. Its typical example is that a Web page indicated by a URL disappears or moves (what is called, a disconnection of a link). Additionally, contents of a Web page indicated by a URL is outdated, and becomes unhelpful in some cases.

Furthermore, although a helpful Web page exists other than a Web page registered by a user, it is not registered because the user does not know its existence. This can also be the obsolescence of a bookmark.

Conventionally, to overcome such a problem, for example, "blink (http://www.blink.co.jp/)" renders the following service using collaborative filtering. The collaborative filtering is a known technique that records information of a liking of a user, and estimates a liking of the user based on the liking information of a different user whose liking is similar to the user. It is known that the more the number of pieces of liking information of each user, or the larger the number of users, the more accurate estimation becomes.

With the above described "blink", each user registers his or her bookmark to a server. The server periodically makes a comparison between each registered bookmark and a bookmark registered by a different person, finds a pair of bookmarks having the same URL, and extracts a difference (a URL that is registered to one bookmark, but not registered to the other) for each pair, thereby rendering the service that can keep the bookmark of an individual up to date.

The above described blink service is effective when bookmarks of a sufficiently large number of users (more than several ten thousands of users) can be registered/used. However, if the number of users is small (on the order of several tens to several hundreds of users), the blink service does not function well despite being applied. This is experimentally/empirically proved.

Additionally, the probability that a difference from a bookmark of a different user is a URL contents of which is helpful is not always high.

Furthermore, a service for providing helpful information located on the Internet or an intranet by classifying and organizing the information as a hierarchical category (hereinafter referred to as a document directory) (such as Yahoo!, goo, ODP (Open Directory Project), etc.) is conventionally implemented.

With such a document directory/service provider, a URL to be registered to a document directory on the Internet or an intranet is manually found and registered to a suitable category. However, the number of URLs is very large at present, and continues to be increasing. For a certain provider, as many as several hundreds of persons perform the above described registration operation. However, their workload is heavy.

Furthermore, many web servers have been operated on an intranet, etc. within an organization such as an enterprise, etc. in recent years, and the demand for building a document directory for an organization has been increasing, similar to Yahoo!, etc. on the Internet. Because maintenance/administration of such a document directory for an organization is made by a small number of persons in many cases, their workload is also heavy even if the scale is relatively small.

Therefore, it is demanded to reduce workload by allowing even part of the above described document directory maintenance/administration operations to be automated, and to reduce the maintenance/administration cost.

As a technique for automatically structuralizing a document directory, a method using clustering is conventionally known. This is a method creating a set so that documents having similar contents are included in the same set. A representative keyword of each set is defined to be a category name. To create a hierarchical structure of sets, a method defining "a set of sets" as a higher-order hierarchy according to the similarity among sets, and a method using the relationship among keywords included in sets are proposed. However, these methods are inferior to manual structuralization in quality. For a commercial directory, these techniques are only used as an auxiliary means.

The present inventor has already proposed "Automatic Collection for Document Directory Administration, Automated Classification Using/URL Automatic Recommending System", Takanori UKAI, Yoshinori KATAYAMA, Hiroshi TSUDA; 5C-01 National Convention of Japanese Society for Artificial Intelligence (2001).

This proposed technique is mainly composed of a process for automatically collecting a good URL to be stored in a directory from the Internet or an intranet, and a process for allocating a document (home page) indicated by the good URL to a suitable category. The process for automatically collecting a good URL takes an approach based on contents, link, or log. However, since the approach based on contents/link has problems that calculation cost is required, and a URL determined to be good is apt to be a URL which indicates particular contents, etc. Therefore, the approach based on log is adopted. With this approach, a technique extracting a keyword used with high frequency from a search log, performing a search by using this keyword, and selecting a URL associated with this keyword is proposed.

With this technique, however, a satisfactory correct answer rate has not been obtained yet, and it is desired that a higher correct answer rate can be obtained (a correct answer of the correct answer rate means that each URL can be registered to a suitable category. Inversely, an incorrect answer indicates the case where an unsuitable URL is recommended to a certain category if the certain category is taken as an example (for instance, a URL whose contents is associated with "aircraft" is recommended to a category "car"), the case where a URL to be originally recommended to this category is not recommended, or the like.

SUMMARY OF THE INVENTION

An object of the present invention is to provide a location information recommending apparatus, method, program, etc., with which an effective recommendation can be received by using not only a bookmark but also a document directory, even if the number of registration users is relatively small, the possibility that a recommended URL is helpful can be increased, and maintenance/administration cost can be decreased by reducing a registration operation of a document directory.

A first location information recommending apparatus according to the present invention is configured by comprising: a category comparing unit generating each category pair, and calculating the degree of similarity for each category pair by obtaining each category and location information included in each category from each of a location information storing unit storing location information on a network in each category, and an individually registered location information storing unit storing each individually registered location information of a plurality of users in each category,; a location information recommendation candidate extracting unit selecting a category pair whose degree of similarity is equal to or higher than a first threshold, and extracting a location information candidate to be recommended each other for each selected category pair; and a first recommending unit recommending, to the location information storing unit, location information to be registered to each category based on the location information candidate to be recommended, which is extracted by the location information recommendation candidate extracting unit, for each selected category pair.

With the first location information recommending apparatus, location information is recommended from a category whose degree of association is high for each category by using individually registered location information (such as a bookmark, etc.) of each user. Therefore, administration operations of location information (such as an addition of a URL, etc.) can be reduced for an administrator, etc. of the location information storing unit (for example, an administrator of a large-scale document directory such as Yahoo!, etc., or a small-scale document directory on an intranet).

A second location information recommending apparatus according to the present invention is configured by comprising: a category comparing unit generating each category pair, and calculating the degree of similarity for each category pair by obtaining each category and location information included in each category from each of a location information storing unit storing location information on a network in each category, and an individually registered location information storing unit storing each individually registered location information of a plurality of users in each category,; a location information recommendation candidate extracting unit selecting a category pair whose degree of similarity is equal to or higher than a first threshold, and extracting a location information candidate to be recommended each other for each selected category pair; and a second recommending unit recommending, to the individually registered location information storing unit, location information to be registered to each category based on the location information candidate to be recommended, which is extracted by the location information recommendation candidate extracting unit, for each selected category pair.

With the second location information recommending apparatus, not only individually registered location information (such as a bookmark, etc.) of a different user, but also data of the location information storing unit is used, whereby an effective location information recommendation can be received even if the number of users is small.

Additionally, the first or the second location information recommending apparatus may further comprise, for example, an access number storing unit storing a total number of accesses made to contents indicated by location information, or a number of accesses made by each user for each location information, and the location information recommendation candidate extracting unit may exclude location information whose number of accesses is equal to or smaller than a second threshold from the location information candidate to be recommended.

Normally, contents of location information (a URL, etc.) whose number of accesses is large is good (helpful) contents with high possibility. Therefore, location information whose number of accesses is not so large is excluded from a recommendation candidate, whereby it becomes possible not to recommend location information having a low possibility of being helpful.

Furthermore, by way of example, the location information recommendation candidate extracting unit may assign a priority to the extracted location information candidate to be recommended, and the recommending unit may sequentially recommend location information, to which a higher priority is assigned, to the location information storing unit or the individually registered location information storing unit.

In this way, better location information is preferentially recommended. This is very effective, especially, in the case where the number of recommendation candidates is large, and the number of recommendations is restricted.

Additionally, the first or the second location information recommending apparatus may further comprise, for example, a weight adjusting unit making a weight set for a category stored in the location information storing unit, and storing the weight, and the location information recommendation candidate extracting unit may determine the priority by using the weight.

For example, a method using the number of categories to which location information is registered exists as a method determining the priority of the location information. This is based on the idea that, for example, location information which is registered to a bookmark, etc. by many users is good with high possibility. In the meantime, if the location information is registered to a category stored in the location information storing unit, a user who desires to preferentially receive a recommendation can possibly exist even if the number of users who register this location information is small. In this case, the weight may be set to a large value. The weight is adjusted as described above, so that each user can receive a recommendation convenient to the user itself. Note that the weight can be also adjusted by an administrator, etc. of the location information storing unit.

Furthermore, the first or the second recommending unit may restrict the number of pieces of location information recommended to the location information storing unit or the individually registered location information storing unit up to a third threshold for each category.

Still further, the present invention is not limited to the forms as the above described apparatuses, and can be configured as a method, a storage medium on which is recorded a program for causing a computer to execute the process of the apparatus or the method, or its propagation signal.

BRIEF DESCRIPTION OF THE DRAWINGS

FIG. 1 is a block diagram showing the function of a location information recommending apparatus;

FIG. 2 shows the basic configuration of a URL recommending system according to a preferred embodiment;

FIG. 5 is a flowchart for explaining an example (No. 1) of a process performed by a category comparing unit;

FIGS. 7A to 7C show a specific example of a process for generating a category pair, and for calculating its degree of similarity;

FIG. 8 exemplifies a specific technique of the process for generating a category pair, and for calculating its degree of similarity;

FIG. 9 is a flowchart for explaining an example (No. 2) of the process performed by the category comparing unit;

FIG. 10 is a flowchart for explaining an example (No. 3) of the process performed by the category comparing unit;

FIGS. 13A to 13D show a specific example of a process for selecting a category pair whose degree of similarity is high, and for extracting a difference URL of the category pair;

FIG. 16 is a schematic diagram for specifically explaining a process for obtaining the number of categories including a difference URL;

FIG. 19 is a flowchart for explaining the process performed by a URL-to-bookmark recommending unit;

FIG. 21 exemplifies storage medium storing a program, or the downloading of a program stored onto a storage medium.

DESCRIPTION OF THE PREFERRED EMBODIMENTS

Figure 3:
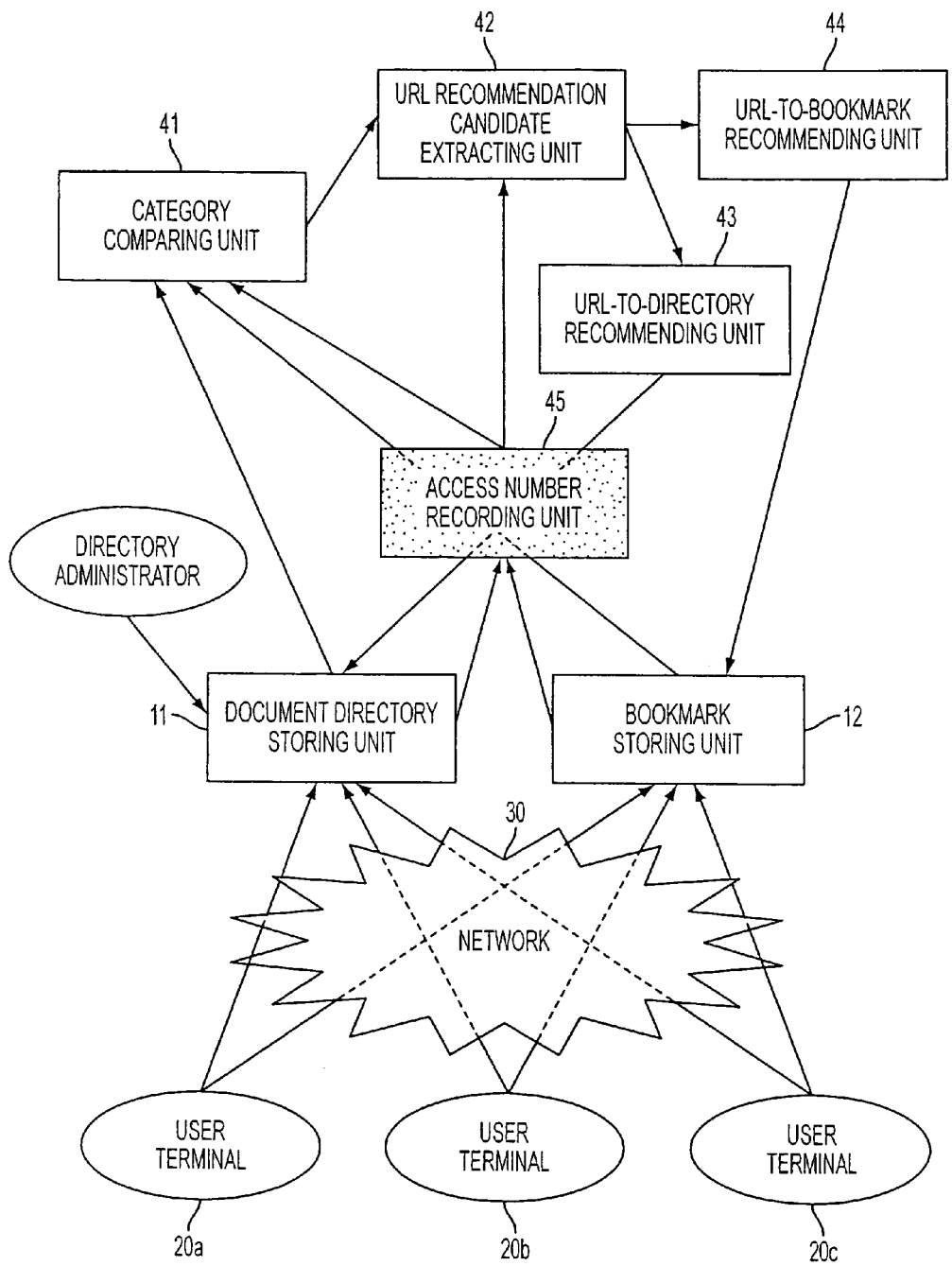
FIG. 3 shows a configuration implemented by adding an access number recording unit to the basic configuration shown in FIG. 2.

Hereinafter, preferred embodiments according to the present invention are described with reference to the drawings.

FIG. 1 is a block diagram showing the function of a location information recommending apparatus according to a preferred embodiment of the present invention. The location information recommending apparatus shown in this figure comprises a location information storing unit 1, an individually registered location information storing unit 2, a category comparing unit 3, a location information recommendation candidate extracting unit 4, a first recommending unit 5, a second recommending unit 6, an access number recording unit 7, and a weight adjusting unit 8.

The location information storing unit 1 classifies location information on a network 9 into respective categories, and stores the information (such as Yahoo!, or the like).

The location information on the network 9 is address information (such as a URL, etc.) which indicates the location of contents on the network 9.

The individually registered location information storing unit 2 stores each individually registered location information of a plurality of users.

The individually registered location information indicates part of the location information on the network, which is classified and registered as a unique category (or a category conforming to a document directory) by each of the plurality of users (for example, a "bookmark", "favorites", or a personalized version of a document directory such as "My Yahoo!").

The category comparing unit 3 generates each category pair, and calculates the degree of similarity for each category pair by obtaining each of the categories and location information included in each of the categories from the location information storing unit 1 and the individually registered location information storing unit 2.

Although details of a method calculating the degree of similarity will be described later, it may take a variety of forms. For example, location information common to two categories is obtained for each pair of the categories, and the number of pieces of the common location information is defined to be the degree of similarity. Or, actual contents indicated by each piece of location information included in each of two categories is obtained, the contents are broken down into words, and the number of common words or the number of words which match a preset keyword is defined to be the degree of similarity. Or, the degree of similarity may be calculated by using the number of accesses recorded to the access number recording unit 7. Its details will be described later.

The location information recommendation candidate extracting unit 4 receives a result of the process performed by the category comparing unit 3, and selects a category pair whose degree of similarity is equal to or higher than a first threshold. Then, the location information recommendation candidate extracting unit 4 extracts a location information candidate to be recommended each other for each selected category pair.

Also a method extracting a recommendation candidate of location information can possibly take a variety of forms. For example, difference location information between two categories is obtained for each selected category pair, and the difference location information is defined to be a recommendation candidate. Furthermore, the number of accesses recorded to the access number recording unit 7 is used, and location information whose number of accesses is small may not be defined to be a recommendation candidate. A variety of other extracting methods exist, and their details will be described later.

The first recommending unit 5 recommends location information to the location information storing unit 1 based on the recommendation candidate of location information, which is extracted by the location information recommendation candidate extracting unit 4, for each selected category pair.

The second recommending unit 6 recommends location information to the individually registered location information storing unit 2 based on the recommendation candidate of location information, which is extracted by the location information recommendation candidate extracting unit 4, for each selected category pair.

The access number storing unit 7 stores/updates a total number of accesses made to the contents indicated by location information, or the number of accesses made by each user for each location information. These numbers of accesses are sometimes used in the process performed by the category comparing unit 3 or the location information recommendation candidate extracting unit 4, as described above.

The weight adjusting unit 8 makes a user or a directory administrator set a weight of a category stored in the location information storing unit 1, and keeps the set value. For example, if the location information recommendation candidate extracting unit 4 defines a URL 1 which is registered to a bookmark, etc. of a different user, and a URL 2 which is registered to the location information storing unit 1 to a certain user to be candidates, it becomes possible to make, by way of example, the URL 2 recommended preferentially by setting the weight. Its details will be described later.

The following description takes a URL as an example of location information on the network. However, the present invention is not limited to the URL. Additionally, the following description takes a bookmark as an example of individually registered location information. However, the present invention is not limited to the bookmark.

FIG. 2 shows the basic configuration of a URL recommending system according to the preferred embodiment.

Additionally, the URL recommending system according to this preferred embodiment may have a configuration implemented by adding an access number recording unit to the basic configuration shown in FIG. 2, for example, as shown in FIG. 3.

Figure 4:
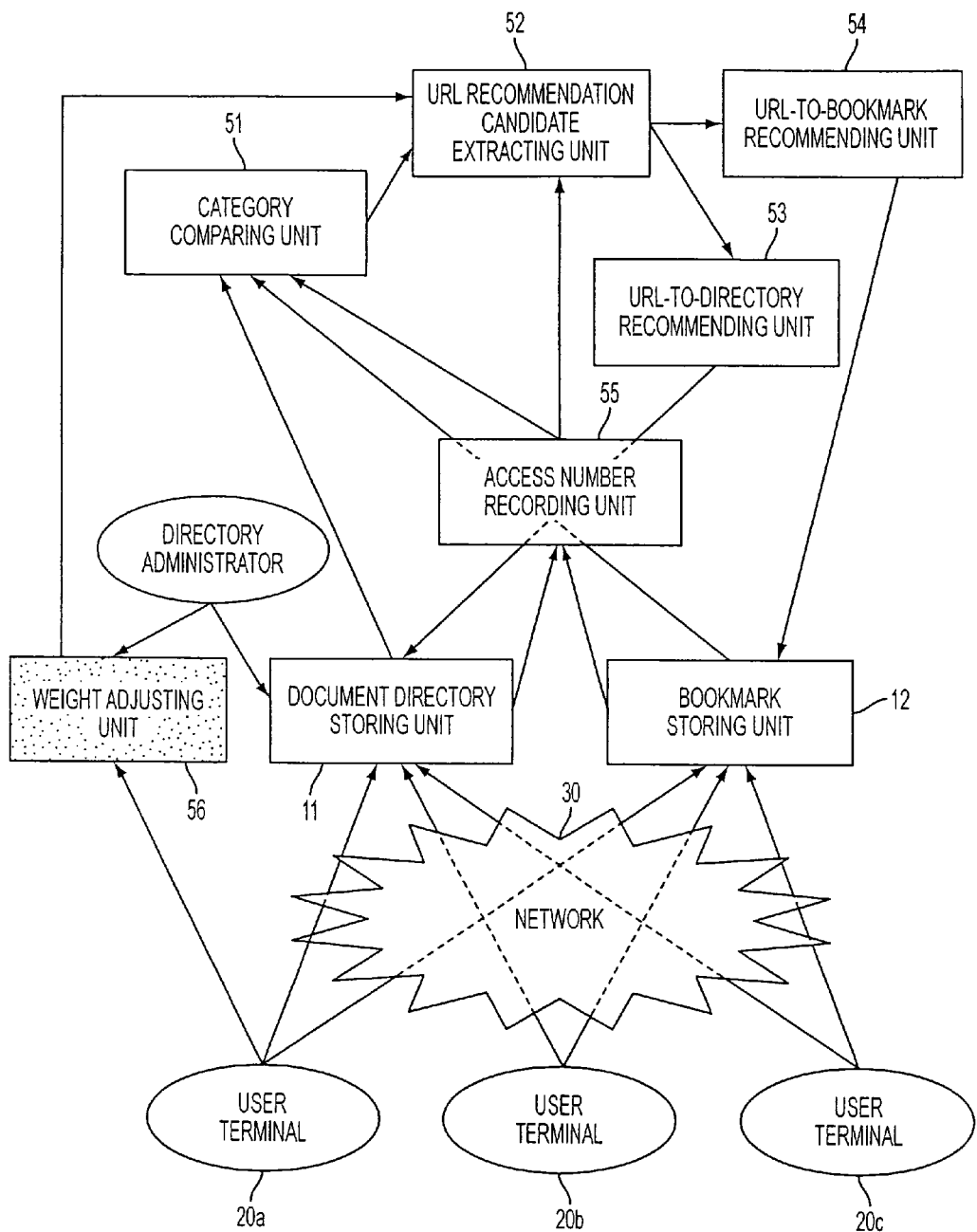
FIG. 4 shows a configuration implemented by adding a weight adjusting unit to the basic configuration shown in FIG. 2.

Furthermore, the URL recommending system according to this preferred embodiment may have a configuration implemented by adding a weight adjusting unit to the basic configuration shown in FIG. 2, for example, as shown in FIG. 4.

In each of the configurations shown in FIGS. 2 to 4, all of units except for user terminals 20 may take a variety of implementation forms. By way of example, all of the units may be integrated into one server (computer), or may be independent computers that are interconnected by dedicated lines, etc. Or, the units may take any form.

Firstly, the basic configuration shown in FIG. 2 is explained.

In FIG. 2, a document directory storing unit 11 has an existing configuration. Additionally, each of the user terminals 20 is an information processing device (personal computer, etc.) used by each user.

This URL recommending system may be a system running in an Internet environment, or a system running in an intranet environment within a company, etc.

If the URL recommending system is a system running in an Internet environment, the document directory storing unit 11 is a database unit of a large-scale document directory at a site where the large-scale document directory such as Yahoo!, etc., is prepared, and a search service, etc. is rendered. For the document directory storing unit 11, as described above, a large number of directory administrators administers (adds, deletes, etc.) the hierarchical structure of the document directory, and also administers (adds, deletes, moves, etc.) a URL registered to each category. Additionally, a network 30 is a public line network, the Internet, etc.

If the URL recommending system is a system running in an intranet environment, the document directory storing unit 11 is a unit which administers, for example, a small-scale document directory within a company. In this case, as described above, a relatively small number of administrators administers (adds, deletes, etc.) the hierarchical structure of the document directory, and also administers (adds, deletes, moves, etc.) a URL registered to each category. Additionally, the network 30 is a LAN within a company, etc.

The bookmark storing unit 12 is a database unit storing bookmark information at a site such as the above described "blink", where some service is rendered by making the user terminal 20 of a user who desires to make registration (hereinafter referred to as a registration user) register the bookmark information.

In the URL recommending system having the configuration according to this preferred embodiment, a category comparing unit 13, a URL recommendation candidate extracting unit 14, and a URL recommending unit (a URL-to-directory recommending unit 15, and a URL-to-bookmark recommending unit 16) are arranged.

The category comparing unit 13 generates category pairs in a round-robin fashion for all of categories, and calculates the degree of similarity for each category pair by obtaining information of each category of a document directory administered by the document directory storing unit 11, and each category of a bookmark of each registration user, which is administered by the bookmark storing unit 12.

The URL recommendation candidate extracting unit 14 first selects a pair of categories, whose degrees of association seem to be high, from among all of category pairs by using a result of the process performed by the category comparing unit 13. Namely, a category pair whose degree of similarity is equal to or higher than a predetermined threshold is selected. Next, a URL candidate to be recommended each other is extracted for each selected category pair.

The URL-to-directory recommending unit 15/the URL-to-bookmark recommending unit 16 respectively recommends a URL to be added to each category to each category stored in the document directory storing unit 11/the bookmark storing unit 12 based on the URL recommendation candidate extracted by the URL recommendation candidate extracting unit 14, upon receipt of a result of the process performed by the URL recommendation candidate extracting unit 14. At that time, all or some of URL recommendation candidates extracted by the URL recommendation candidate extracting unit 14 may be recommended. Furthermore, as will be described in detail later, the URL recommendation candidate extracting unit 14 assigns priorities to the URL recommendation candidates, so that a better URL (a good URL is a URL indicating contents that is effective/helpful with high possibility) may be preferentially recommended.

Next, explanation is provided with reference to FIG. 3.

The URL recommending system shown in FIG. 3 has a configuration implemented by adding an access number recording unit 45 to the basic configuration shown in FIG. 2. A variety of process examples exist for the category comparing unit and the URL recommendation candidate extracting unit as will be described later, and any of the process examples may be adopted. Among them, a process example using the number of accesses (the number of use times) exists. FIG. 3 shows the configuration corresponding to such a process example.

The access number recording unit 45 obtains the number of accesses made to each URL that is registered to each category stored/administered by the document directory storing unit 11 or the bookmark storing unit 12 from either of these units depending on need, and stores (updates) the obtained number.

Here, the number of accesses made to each URL that is registered to each category stored/administered by the document directory storing unit 11 is the number of accesses made to the home page indicated by the corresponding URL, and is normally on the order of several thousands to several millions.

In the meantime, the number of accesses made to each URL that is registered to each category stored/administered by the bookmark storing unit 12 is the number of times that each user uses the home page indicated by the corresponding URL, and is normally on the order of several to several hundreds of times.

As described above, different numbers of accesses are stored even for one URL, and the numbers of accesses vary with time respectively. Therefore, the newest number of accesses must be obtained and updated.

The category comparing unit 41 and the URL recommendation candidate extracting unit 42 respectively obtain data of the number of accesses made to each URL for each category from the access number recording unit 45, and perform a process using the number of accesses. Although details of a process example will be described later, especially, a URL whose number of accesses is relatively small is not defined to be a recommendation candidate by the URL recommendation candidate extracting unit 42, so that only a better URL can be defined as a recommendation candidate.

FIG. 3 does not mean that both of the category comparing unit 41 and the URL recommendation candidate extracting unit 42 always perform the process using the number of accesses. Both of the units may perform such a process, but either of them may perform such a process.

Next, explanation is provided with reference to FIG. 4.

The URL recommending system shown in FIG. 4 has a configuration implemented by adding a weight adjusting unit 56 to the basic configuration shown in FIG. 2 as described above. Although FIG. 4 depicts an access number recording unit 55, this unit may be arranged or unarranged. Namely, the access number recording unit 55 does not directly relate to the function of the weight adjusting unit 56, and FIG. 4 only shows the configuration corresponding to the case where a category comparing unit 51 or a URL recommendation extracting unit 52 performs a process using the number of accesses.

The weight adjusting unit 56 prompts a directory administrator or a user to set the weight of a directory, and records the set weight. The user accesses the weight adjusting unit 56 from his or her user terminal 20 via the network 30, and sets a desired weight.

Although the weight of a directory will be described in detail later, it is used as a weight when the URL recommendation candidate extracting unit 52 assigns a priority to an extracted URL recommendation candidate. The heavier the weight, the higher the priority of recommending a URL from a document directory. Namely, for instance, if there are a URL 1 which exists in bookmarks of a plurality of users, and a URL 2 which exists in a document directory as URLs recommended to a bookmark of a certain user, the URL 2 is added to the bookmark of the user preferentially on the condition that the weight of the directory is heavier. For example, if a user considers that "the reliability of a recommendation from a document directory (the number of helpful URLs is larger) is higher than that of a recommendation from a bookmark of a different user", the weight of the directory may be increased. In this way, a user can receive a recommendation convenient to the user itself by setting the weight.

The category comparing unit, the URL recommendation candidate extracting unit, the URL-to-bookmark recommending unit, and the URL-to-directory recommending unit are respectively explained in detail below. As described above, for example, in FIG. 3, the category comparing unit 41 and the URL recommendation candidate extracting unit 42 do not necessarily perform the process using the number of accesses. This is similar also in FIG. 4. Accordingly, for instance, the category comparing unit is distinguished as the category comparing unit 13, 41, or 51 in FIGS. 2 to 4. However, the following explanation does not distinguish among these units, and denotes them as the category comparing unit 51 as a representative. Also the other units are denoted as the URL recommendation candidate extracting unit 52, the URL-to-directory recommending unit 53, and the URL-to-bookmark recommending unit 54 as representatives.

Examples of the process performed by the category comparing unit 51 are first explained below.

FIGS. 5 and 9 to 11 are flowcharts for explaining examples (Nos. 1 to 4) of the process performed by the category comparing unit 51.

Firstly, the example (No. 1) of the process performed by the category comparing unit 51 is explained with reference to FIG. 5.

The process shown in FIG. 5 is performed in a round-robin fashion for all of pairs of categories of a bookmark of each registration user, and categories of a document directory.

Firstly, one arbitrary category of the bookmark or the document directory is selected (step S11), and all of URLs (represented as a URL(A)) existing within the category are obtained (step S12). Next, one arbitrary category (other than the category selected in step S11) of the bookmark or the document directory is selected (step S13), and all of URLs (represented as a URL (B)) existing within the category are obtained (step S14).

Then, a comparison is made between the URL (A) and the URL (B), the number of (common) URLs existing within both of them is obtained, and this number is stored as the degree of similarity of this category pair (step S15).

The above described process is explained by taking an example. The following description takes a simple example for ease of explanation.

Figure 6:
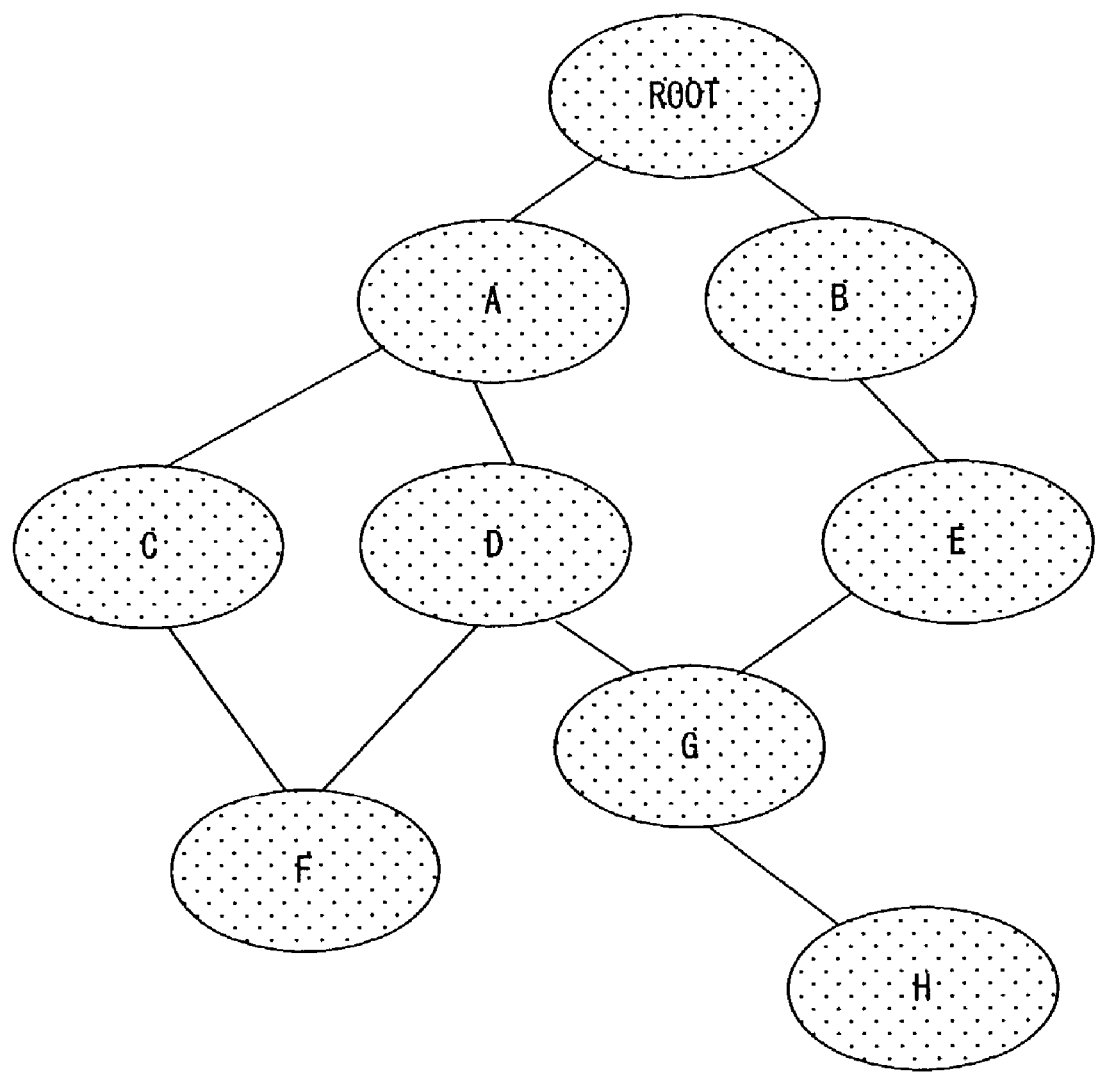
FIG. 6 exemplifies a hierarchical structure of a document directory.

First assume that the document directory has a lattice structure shown in FIG. 6. In this figure, A to H represent categories. Also assume that the categories of each bookmark also have some hierarchical structure, although this is not shown.

However, the process according to this preferred embodiment is performed by using a common/difference URL registered to each category, regardless of how the structure is built, and whether or not category names are alike.

A URL registered to each category is represented by a pair of a category name and a URL.

For example, the categories of the above described document directory are represented as shown in FIG. 7A. (for instance, (C, URL 1), (C, URL 2), (C, URL 3), etc.). In the example shown in this figure, for instance, a URL 1, a URL 2, and a URL 3 are included in a category C.

Additionally, categories of a bookmark of each registration user are represented as shown in FIG. 7B. Here, assume that, for example, categories of a bookmark of a user are represented as a1, a2, . . . , and those of a user b are represented as b1, b2 . . . . . In the example shown in this figure, for instance, a URL 1, a URL 3, and a URL 10 are included in the category a1 of the bookmark of the user a. ((a1, URL 1), (a1, URL 3), (a1, URL 10)).

With the operations of the above described steps S11 to S15, these categories are compared in a round-robin fashion, and, for example, a table 60 shown in FIG. 7C is generated. The table 60 stores the degree of similarity 63 in correspondence with a pair of categories indicated by category names 61 and 62.

In this example, for the pair of the categories C and a1, URLs common to both of the categories are the URL 1 and the URL 3. Therefore, the degree of similarity results in "2".

An example of a specific technique of the above described process for obtaining the degree of similarity for each category pair is shown in FIG. 8.

The category comparing unit 51 first generates a table 70 shown in FIG. 8 based on data of categories obtained from the document directory storing unit 11 and the bookmark storing unit 12.

Firstly, all of URLs (URL 1, URL 2, URL 3, URL n), which are included in the categories, are arranged in the horizontal direction of the table 70 in an upper portion of FIG. 8 based on the data of the categories obtained from the document directory storing unit 11 and the bookmark storing unit 12. Namely, the URL 1 to the URL n are included in any of the categories (at least one or more categories) shown in the table 70. Additionally, all of the obtained categories (a1, a2, . . . , E, F, . . . ) are arranged in the vertical direction of the table 70 in FIG. 8. The categories of the document directory and the bookmark are arranged without being distinguished.

Furthermore, in the table 70, whether or not each URL is included in each category is represented by one bit (flag) for each of the categories. If a URL is included, a flag is set to 1. If the URL is not included, the flag is set to 0 (all of flags are set to 0 in the initial state). Then, data of the obtained categories is referenced, and a flag is set (to 1) for a URL included in a category for each of the categories. Since the URL 1, the URL 3, and the URL 10 are included in the category a1 in the example shown in FIG. 7, flags are set as shown in FIG. 8. This operation is performed for all of the categories.

Then, pairs of all of the categories are generated in a round-robin fashion, the flags are compared for all of the category pairs, and the number of URLs whose flags are set to 1 in both of categories is counted.

The value of n of the URL n may be on the order of several thousands to several hundreds of thousands. With this technique, however, a data group represented by 1 bit is only compared, so that a processing time is not so required even if the value of n is on the order of several hundreds of thousands.

Next, the example (No. 2) of the process performed by the category comparing unit 51 is explained with reference to FIG. 9.

The process shown in FIG. 9 is performed in a round-robin fashion for all of pairs of categories of a bookmark of each registration user, and categories of a document directory.

Because operations of steps S21, S22, S23, and S24 in FIG. 9 are the same as those of steps S11, S12, S13, and S14 in FIG. 5, their explanations are omitted.

In this process example (No. 2), the number of common words, which is obtained by performing the operation of step S25, is defined to be the degree of similarity for URL groups (represented by a URL (A) and a URL (B) in a similar manner as in the process example (No. 1)), which are obtained with the operations of steps S21, S22, S23, and S24, and included in each category.

With the operation of step S25, contents of a home page, etc. indicated by each URL of the URL (A) is first obtained, and each contents is broken down into words (except for a postpositional word and an auxiliary verb) by using, for example, existing morphological analysis/parsing software (such as "Breakfast" provided by Fujitsu Laboratories, etc.). Also for the URL (B), each contents is broken down into words in a similar manner.

if a plurality of identical words exist, they are collected into one.

Next, a comparison is made between the word groups respectively obtained for the URL (A) and the URL (B), a word common to both of the groups is extracted, and the number of common words is recorded. The number of common words is defined to be the degree of similarity in this process example (No. 2).

Next, the example (No. 3) of the process performed by the category comparing unit 51 is explained with reference to FIG. 10.

The process shown in FIG. 10 is performed in a round-robin fashion for all of pairs of categories of a bookmark of each registration user, and categories of a document directory.

In the process example (No. 3) shown in FIG. 10, one arbitrary category of the bookmark or the document directory is first selected (step S31), and all of URLs (represented as a URL (A)) existing within this category are obtained (step S32). Next, one arbitrary category (other than the category selected in step S31) of the bookmark or the document directory is selected (step S33), and a keyword (referred to as a keyword (B)) preregistered for this category is obtained (step S34).

Namely, in this process, each registration user is made to preregister an arbitrary keyword for each category of his or her own bookmark. Also for each category of the document directory, a directory administrator, etc. is made to preregister a keyword (the number of keywords is one or more). With the operation of the above described step S34, this keyword is extracted.

Furthermore, contents of the URL (A) obtained in step S32 are broken down into words in a similar manner as in the above described step S25 (if a plurality of identical words exist, they are collected into one). Then, the number of words which match the above described keyword is counted among these words, and the counted number is recorded. In this process example (No. 3), the number of words which match a keyword is defined to be the degree of similarity.

Next, the example (No. 4) of the process performed by the category comparing unit 51 is explained with reference to FIG. 11.

Figure 11:
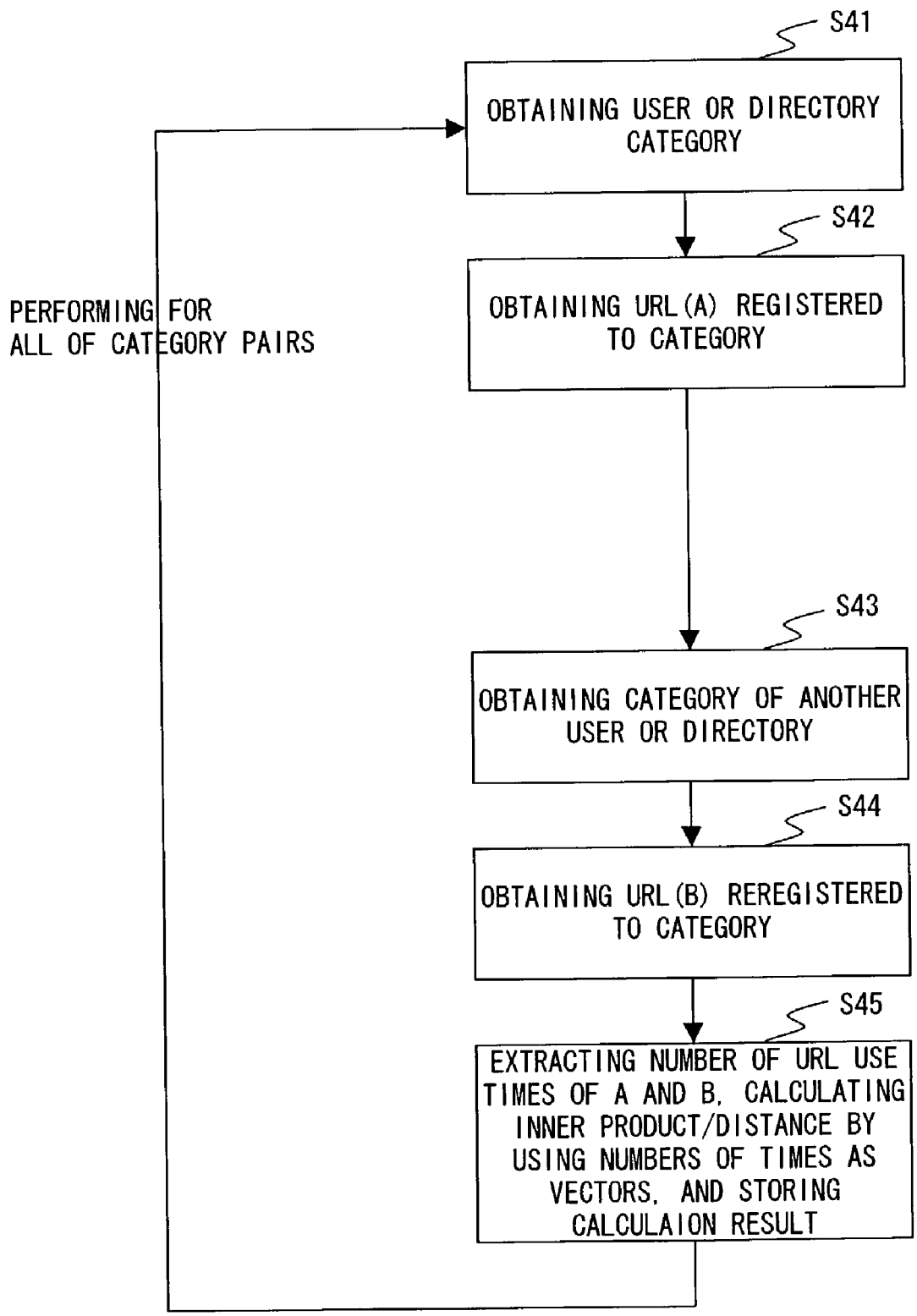
FIG. 11 is a flowchart for explaining an example (No. 4) of the process performed by the category comparing unit.

The process shown in FIG. 11 is performed in a round-robin fashion for all of categories of a bookmark of each registration user, and categories of a document directory.

Since operations of steps S41, S42, S43, and S44 in FIG. 11 are the same as those of steps S11, S12, S13, and S14, their explanations are omitted.

In this process example (No. 4), an "inner product/distance of vectors", which is obtained by performing the operation of step S45 for URL groups (a URL(A) and a URL(B)) which are obtained with the operations of steps S41, S42, S43, and S44 and included in each category, is defined to be the degree of similarity.

With the operation of step S45, the number of times that each URL of the URL (A) is used, and the number of times that each URL of the URL (B) is used are obtained, the inner product/distance is calculated by using the obtained numbers as vectors, and a result of the calculation is recorded as the degree of similarity. Assume that the URL (A) and the URL (B) are URLs respectively included in the categories of the document directory and those of the bookmark. Here, the URLs are denoted as u1, u2, . . . , etc., and assume that the URL (A)=(u1, u2, u3), and the URL (B)=(u1, u2, u4). Also assume that the number of times that each of the URLs of the URL (A) is used is (du1, du2, du3), and the number of times that each of the URLs of the URL (B) is used is (uu1, uu2, uu4). In this case, if the inner product/distance is calculated by using the numbers as vectors $$\text{inner product/distance} = \frac{(du1 \times uu1 + du2 \times uu2 + du3 \times uu4)}{\sqrt{\{(du1-uu1)^2 + (du2-uu2)^2 + (du3-uu3)^2\}}} \quad \text{(equation 1)}$$

Note that du1, du2, and du3, namely, the numbers of use times of the document directory mean the numbers of accesses made to the respective URLS, and are normally on the order of several thousands to several hundreds of thousands. Although their digits are different from those of the numbers of use times of a user, the inner product/distance is calculated by using the numbers as vectors (that is, cos θ of an angle formed by two vectors is obtained). Accordingly, there are no problems.

Next, examples of the process performed by the URL recommendation candidate extracting unit 52 are explained.

FIGS. 12, 14, 15, and 17 are flowcharts for explaining examples (Nos. 1 to 4) of the process performed by the URL recommendation candidate extracting unit 52.

Firstly, the example (No. 1) of the process performed by the URL recommendation candidate extracting unit 52 is explained with reference to FIG. 12.

The URL recommendation candidate extracting unit 52 obtains a preset/preregistered "threshold r of the degree of similarity" (step S51). As the value of the "threshold r of the degree of similarity", a value depending on what is defined to be the degree of similarity by the category comparing unit 51 is used. For example, if the category comparing unit 51 defines the number of URLs common to both of categories to be the degree of similarity as in the above described process example (No. 1), the threshold r having a value according to this number is set.

Next, data is obtained from the category comparing unit 51 (step S52). Namely, data of the degree of similarity of each category pair, which is stored as a result of any of the processes shown in FIGS. 5 and 9 to 11, is obtained.

Then, a comparison is made between the degree of similarity and the threshold r for all of category pairs, and a category pair whose degree of similarity is higher than the threshold ("YES" in step S54) is selected and stored. At that time, a difference URL of this category pair is extracted, and recorded as a URL candidate to be recommended (step S55).

The above described process is explained with reference to a specific example shown in FIGS. 13A to 13D.

On the left side of FIG. 13A, URLs included in categories of a document directory are shown. Although the numbers of times that the respective URLs are used (the numbers of accesses) are shown on the right side of FIG. 13A, these are irrelevant to the process of FIG. 12, and is used in the process of FIG. 14. Therefore, they are not explained here.

On the left side of FIG. 13B, URLs included in categories of a bookmark of an arbitrary user a are shown. Although the numbers of times that the respective URLs are used are shown on the right side of this figure, they are not also explained here similar to the above described numbers.

FIG. 13C shows a result of the process, which is performed by the category comparing unit 51 (here, the example (No. 1) of the process (No. 1) is taken) for the examples shown in FIGS. 13A and 13B, in the form of a table. This table 80 is composed of data entries such as category names 81 and 82, and the degree of similarity 83 likewise the above described table 60. As shown in this figure, the number of common URLs is stored as the degree of similarity 83 for each category pair.

With the operation of the above described step S52, the table shown in FIG. 13C is read from the category comparing unit 51. Then, with the operations of steps S53 to S55, a comparison is made between the degree of similarity and the threshold r (here, r is set to 1) for each category pair, a category pair whose degree of similarity is higher than the threshold r is obtained, and a result of extracting a difference URL is stored in a table 90 shown in FIG. 13D for each obtained category pair.

The table 90 shown in FIG. 13D is composed of category names 91 and 92, which represent each category pair, and a difference URL 93 of this category pair.

Since category pairs whose degrees of similarity are higher than the threshold r (r=1) are a pair of categories C and a1, and a pair of categories H and a3 in this example, they are stored in the table 90 shown in FIG. 13D. Additionally, a difference URL of the pair of the categories C and 1a is a URL 9, and difference URLs in the pair of the categories H and a3 are a URL 8 and a URL 10, and they are respectively stored as the difference URL 93 in the table 90. These URLs become URL candidates to be recommended each other for each category pair.

In this figure, the difference URLs of the bookmark and document directory categories coexist as the difference URL 93. Actually, however, it is desirable to separately store difference URLs which respectively exist in bookmark and document directory categories.

Figure 12:
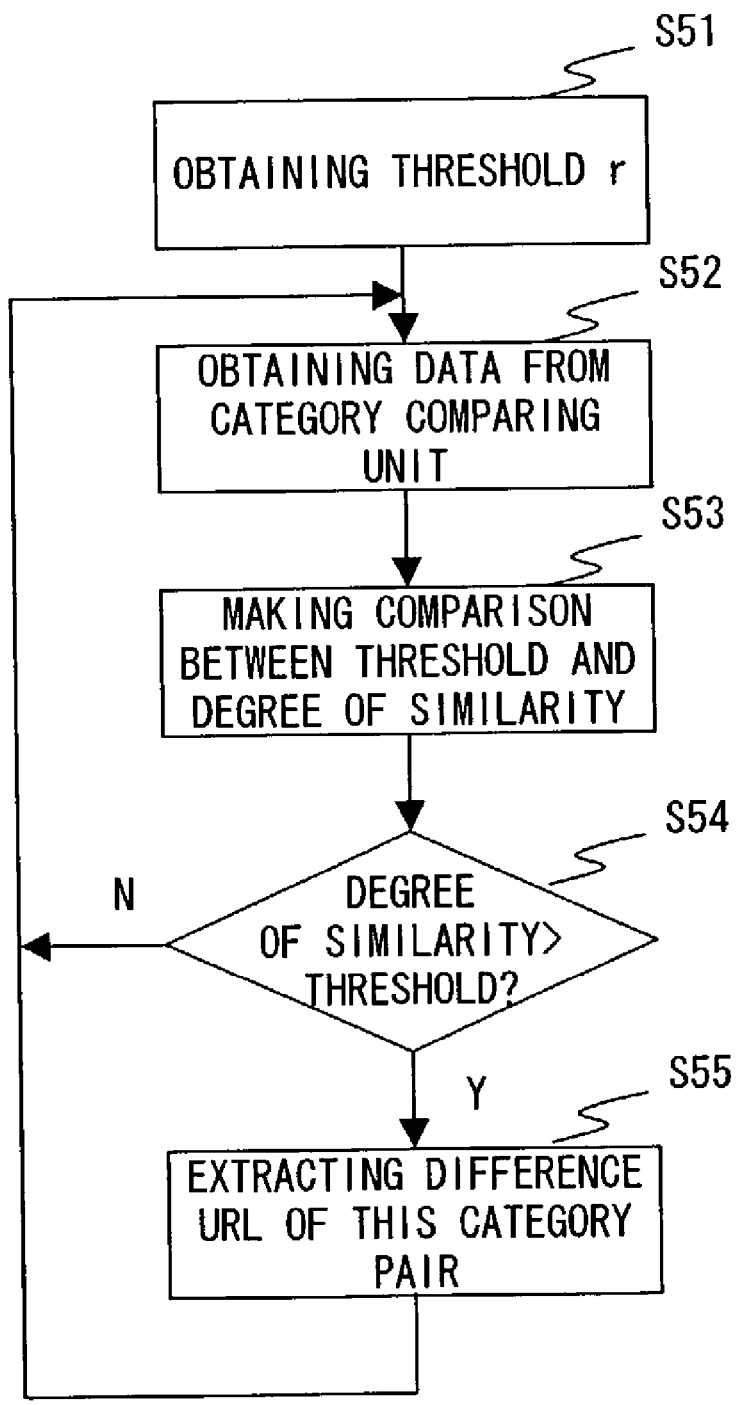
FIG. 12 is a flowchart for explaining an example (No. 1) of a process performed by a URL recommendation candidate extracting unit.

In the example (No. 1) of the process performed by the URL recommendation candidate extracting unit 52, which is shown in FIG. 12, a pair of categories whose degrees of association are expected to be high is extracted by determining whether or not the degree of similarity is higher than the threshold r. However, it is demanded not only to recommend a difference URL as a candidate, but also to allow a better URL to be recommended.

Examples (Nos. 2 to 4) of the process performed by the URL recommendation candidate extracting unit 52, which are described below, propose a technique for increasing the possibility of allowing a better URL to be recommended.

The example (No. 2) of the process performed by the URL recommendation candidate extracting unit 52 is explained below with reference to FIG. 14.

Figure 14:
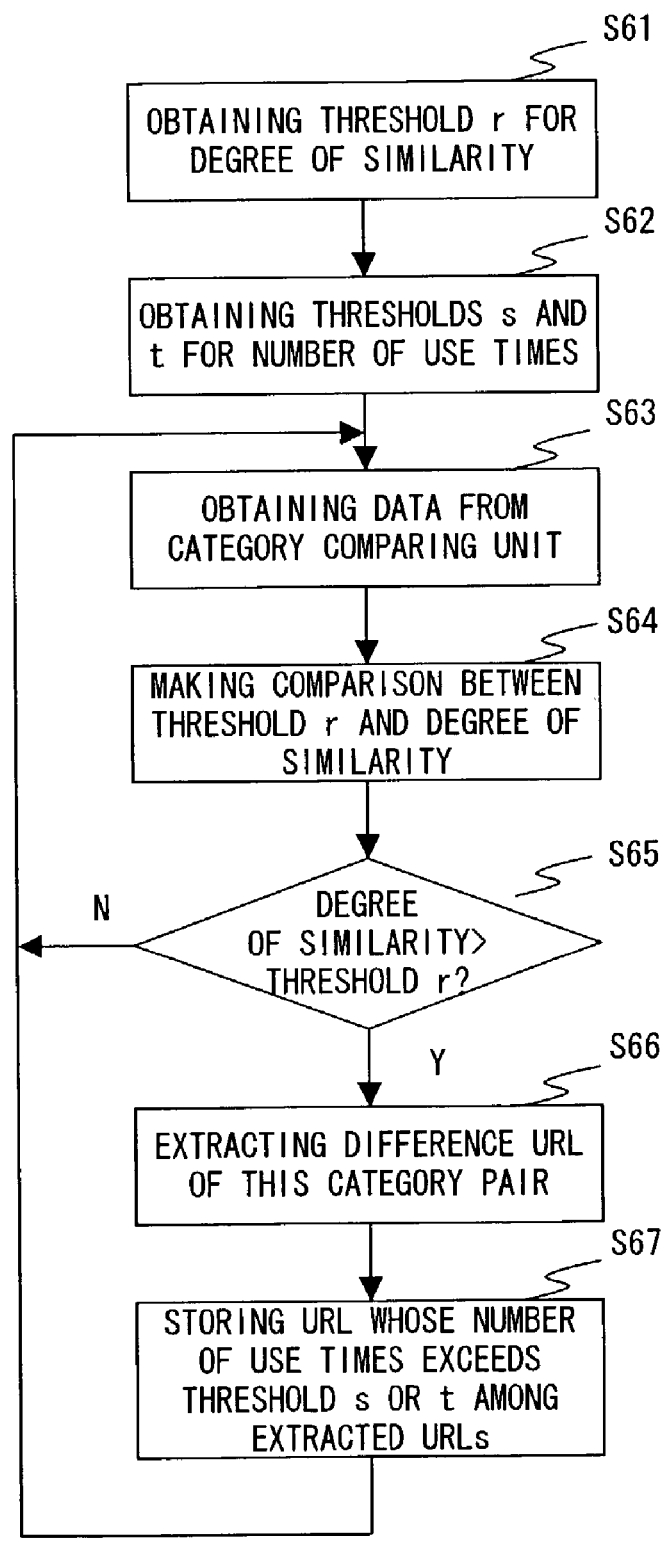
FIG. 14 is a flowchart for explaining an example (No. 2) of the process performed by the URL recommendation candidate extracting unit.

Since operations of steps S61 and S63 to S66 in the process shown in FIG. 14 are the same as those of steps S51 to S55 shown in FIG. 12, their explanations are omitted.

In this process, preset/preregistered "thresholds s and t of the number of use times" are obtained with the operation of step S62. The reason why these two thresholds are used is that a difference normally exists between the digits of the number of use times, for example, of a home page of a certain URL on the sides of a user and a document directory. Namely, the number of use times, which means the number of times that the user uses the URL, is on the order of several to several hundreds of times. In the meantime, the number of use times, which means the number of accesses made to the home page of the URL, is on the order of several thousands to several millions of times. Because the digits of the numbers of use times are different, thresholds are set separately. Here, a threshold for the number of use times of a user is defined to be the threshold s (a threshold for the document directory side is naturally the threshold t).

Then, only a URL, whose number of accesses exceeds the threshold s or t, is left as a URL candidate to be recommended among difference URLs extracted with the operation of step S66 (step S67). This is the characteristic of this process.

The above described process shown in FIG. 14 is again explained with reference to FIG. 13.

As stated earlier, on the right side of FIGS. 13A and 13B, the numbers of use times of the URLs are shown. Here, assume that the thresholds s and t are respectively 3 and 3,000. Additionally, at the stage of the operation of step S66, the URLs shown in FIG. 13D are regarded as being obtained.

In this example, for the pair of the categories C and a1, the URL 9 is a URL on the side of the document directory, and its number of use times is 7,000. If a comparison is made between this number and the threshold t, the number of use times is larger than the threshold t. Therefore, the URL 9 is left as a URL to be recommended to the bookmark as a result of performing the operation of step S67 for this example.

In the meantime, for the pair of the categories H and a3, the URL 8 is a URL on the side of the document directory, and its number of use times is 2,000. If a comparison is made between this number and the threshold t, the number of use times does not exceed the threshold t. Therefore, the URL 8 is excluded from a URL candidate to be recommended to the bookmark. Furthermore, the URL 10 is a URL on the side of the user (registered to the bookmark), and its number of use times is 2. If a comparison is made between this number and the threshold s, the number of use times does not exceed the threshold s. Therefore, the URL 10 is excluded from a URL candidate to be recommended to the bookmark. As described above, there is no URL to become a recommendation candidate for the pair of the categories H and a3 in this simple example. Actually, however, the number of difference URLs is considered to become larger (especially, the number of URLs to be recommended from the document directory side to the user side is considered to become very large). Rather, the above described operations contribute to a decrease in the number of URLs to be recommended. Besides, the operations cannot only reduce the number of URLs, but also leave a good URL.

The example (No. 3) of the process performed by the URL recommendation candidate extracting unit 52 is explained below with reference to FIG. 15.

Figure 15:
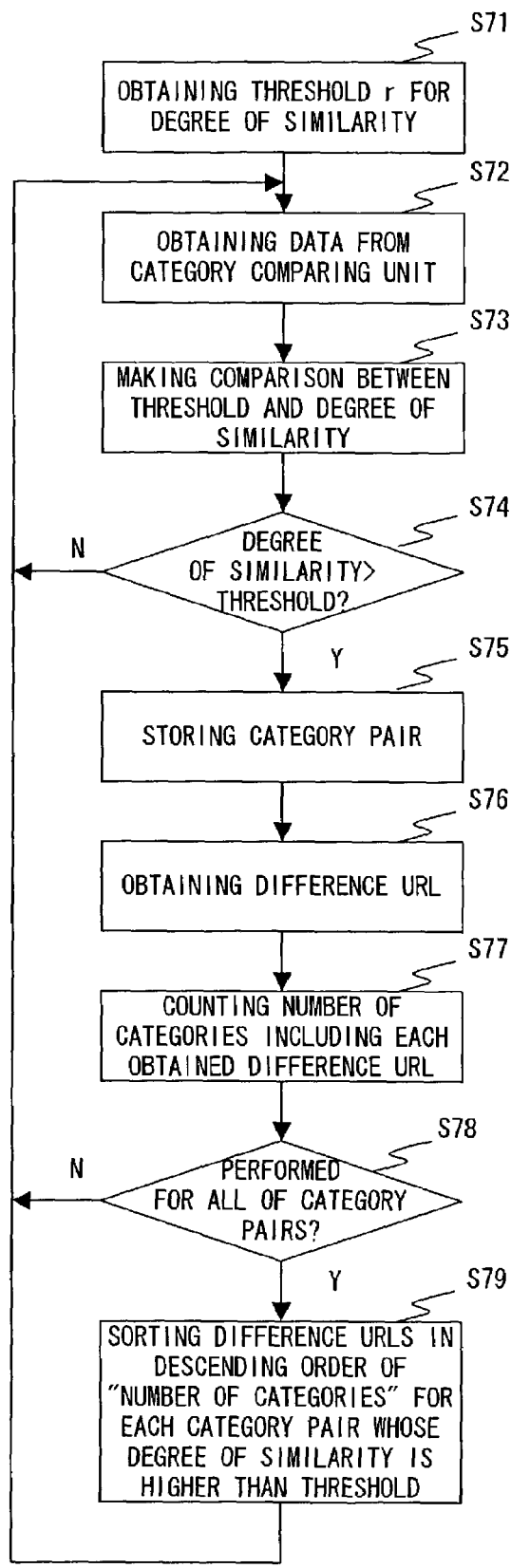
FIG. 15 is a flowchart for explaining an example (No. 3) of the process performed by the URL recommendation candidate extracting unit.

Since operations of steps S71 to S76 in the process shown in FIG. 15 are the same as those of steps S51 to S55 shown in FIG. 12 (the operations of steps S75 and S76 are merely represented by dividing the operation of step S55 into two), their explanations are omitted.

The number of categories including each difference URL among all of categories is counted for each difference URL extracted with the operation of step S76 for each category pair, and the count value is stored (step S77).

After the operations of steps S72 to S77 have been repeatedly performed for all of the category pairs ("YES" in step S78), an operation of step S79 is performed by using the data stored with the operations of steps S75 to S77, namely, a category pair which satisfies the condition that the degree of similarity is higher than a threshold, the difference URLs, and the data of count values.

The operation of step S79 is an operation for sorting difference URLs in descending order of count values for each category pair. As a result of this operation, a URL whose count value is larger is preferentially recommended in the case where the number of recommended URLs is restricted in the process performed by the URL-to-bookmark recommending unit 54 or the URL-to-directory recommending unit 53, which will be described later. Here, the URL whose count value is larger is a URL that is used in a lot more categories as described above. Therefore, there is a high possibility that it is a good URL.

Here, a specific technique of the operation of the above described step S77 is explained with reference to FIG. 16. It is firstly assumed that, for example, also the table 70 described with reference to FIG. 8 is obtained from the category comparing unit 51 in this process example (No. 3) and a process example (No. 4) to be described later.

FIG. 16 shows the table thus obtained. For ease of understanding of the explanation, the table 100 shown in this figure is depicted merely by changing the data contents of the table 70 shown in FIG. 8.

Firstly, if the pair of the categories a1 and C is obtained as a category pair, which satisfies the condition that the degree of similarity is higher than the threshold r, with the operation of the above described step S74, difference URLs obtained with the operation of step S76 are a URL 2 and a URL 4 in the example shown in FIG. 16. The operation of the above described step S77 obtains the number of categories including each of the URL 2 and the URL 4 among all of categories (images enclosed by dotted lines in FIG. 16) for each of the URLs. Since a URL having a larger number of categories is used by more users, it can be expected to be a good URL with high possibility. As a result, in the subsequent operations, the URL 4 is added to the category a1 preferentially.

Next, the example (No. 4) of the process performed by the URL recommendation candidate extracting unit 52 is explained below with reference to FIG. 17.

The basic flow of this process example (No. 4) is almost the same as that of the above described example (No. 3), but a difference exists in a point that a count value is not obtained simply, but assigned a weight.

Figure 17:
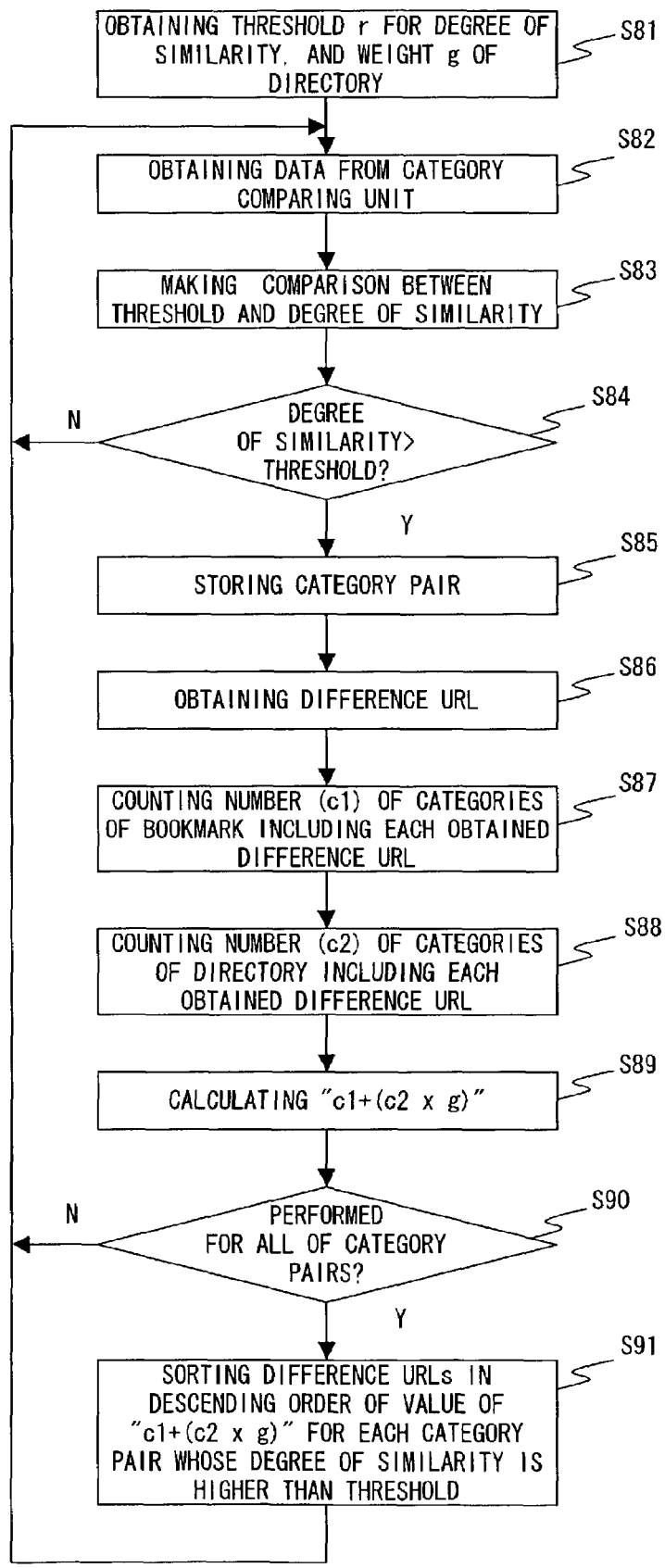
FIG. 17 is a flowchart for explaining an example (No. 4) of the process performed by the URL recommendation candidate extracting unit.

Namely, with the process shown in FIG. 17, the threshold r of the degree of similarity is first obtained, and at the same time, a weight g of a document directory is obtained (step S81). Subsequent operations of steps S82 to S86 are the same as those of the above described steps S72 to S76.

In this process, operations of steps S87 to S89 are performed instead of the operation of step S77. With the operation of step S77, the number of categories including a difference URL among all of categories is first counted. In this process, however, categories are classified into bookmark and document directory categories, and the number of categories is counted.

That is, the number of categories including a difference URL among all of bookmark categories is counted for each difference URL obtained with the operation of step S86, and this count value (c1) is recorded (step S87).

Additionally, the number of categories including a difference URL among all of document directory categories is counted for each difference URL obtained with the operation of step S86, and this count value (c2) is recorded (step S88).

Then, a weight is assigned to the count value (c2), and a total count value is obtained. Namely, "c1+(c2×g)" is calculated and stored (step S89).

The weight g of a document directory is, for example, a preset arbitrary integer. The weight may be set by each user or an administrator on the document directory side. A user sets the weight g of a document directory, so that whether a recommendation is preferentially received from either a different user or a document directory can be specified. Assume that difference URLs obtained for a certain category pair in step S86 are a URL 1 and a URL 2. Also assume that c1 and c2 are respectively 2 and 1 for the URL 1, and 5 and 0 for the URL 2. In this case, the count values are respectively 3 and 5 in the above described process example (No. 3), and the priority of the URL 2 becomes higher (if it is sorted in step S79, it becomes further higher). In this process, for instance, if a certain user sets the weight g of a document directory to 10, "c1+(c2×g)" results in 12 and 5 respectively, and the priority of the URL 1 becomes higher. That is, the URL (the URL 1 in this example) included in the category of the document directory can be recommended preferentially. In other words, in this case, the user considers that the document directory is more reliable than the bookmark of a different user.

Additionally, if an administrator, etc. on the document directory side sets the weight g of a document directory, for example, to a large value, a higher priority is assigned to a URL recommended from the document directory side as described above. For instance, if a URL registered to a document directory is actively desired to be learned by each user (desired to be registered to a bookmark by each user), the weight g may be set to a large value.

Furthermore, a personalized version of a document directory can be easily provided (or received) if the weight g is set to a very large value regardless of whether it is set by either a user or an administrator on the document directory side. As the personalized version of a document directory, for example, "My Yahoo!", etc. is known.

Namely, the present invention is also applicable to an automatic update of the contents of the personalized version of a document directory, such as "My Yahoo!", etc.

In this case, the above described processes such as the category comparison, the URL recommendation, etc. may be performed by using not only categories of a bookmark of each user, but also categories of, for example, "MYYahoo!", or the like of each user.

After the operations of the above described steps S82 to S89 have been repeatedly performed for all of category pairs ("YES" in step S90), an operation of step S91 is performed by using the data stored with the operations of steps S85 to S89, namely, a category pair, which satisfies the condition that the degree of similarity is higher than a threshold, a difference URL, and the data of "c1+(c2×g)".

The operation of step S91 is an operation for sorting difference URLs in descending order of the value of "c1+(c2× g)" for each category pair.

Next, examples of processes performed by the URL-to-bookmark recommending unit 54, and the URL-to-directory recommending unit 53 are explained below.

The URL-to-bookmark recommending unit 54 and the URL-to-directory recommending unit 53 are units recommending a URL to be newly added to each category of a bookmark or a document directory based on a URL recommendation candidate extracted by the URL recommendation candidate extracting unit 52.

The URL-to-bookmark recommending unit 54 and the URL-to-directory recommending unit 53 may recommend, for example, the URL recommendation candidate extracted by the URL recommendation candidate extracting unit 52 to each category of a bookmark or a document directory unchanged (especially, if the URL recommendation candidate extracting unit 52 performs the above described process example (No. 1 or No. 2).

In the meantime, especially, if URLs within a category of the document directory are recommended to the bookmark side, its number sometimes becomes very large. If they are recommended unchanged, an extra load can possibly be imposed on a user on the contrary. Also, if a URL within a category of the bookmark is recommended to the document directory side, or if recommendations are made between bookmarks each other, the number of recommended URLs is excessively large (also a URL that is not so good is included) in some cases.

Figure 18:
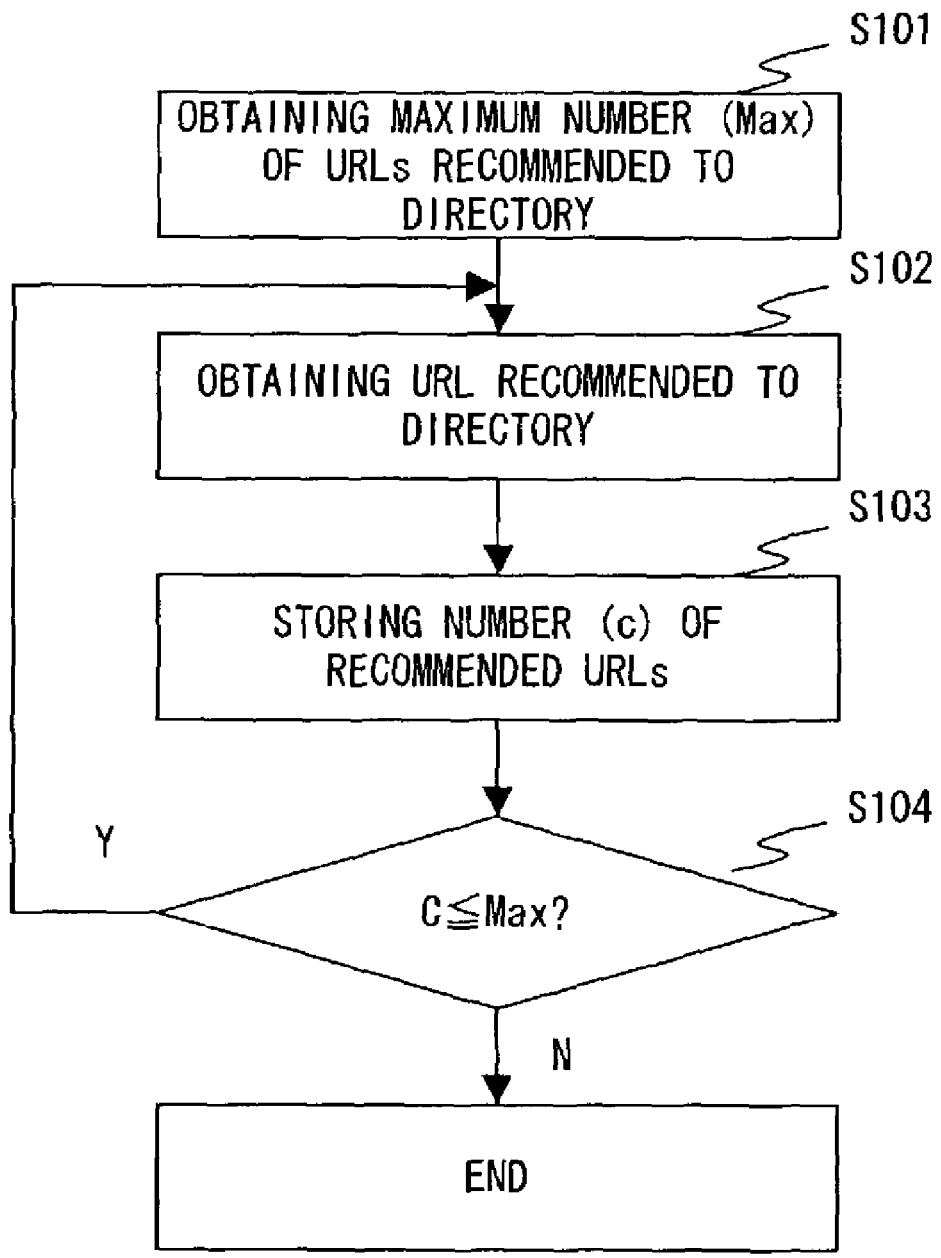
FIG. 18 is a flowchart for explaining the process performed by a URL-to-directory recommending unit.

Considering such a situation, the URL-to-bookmark recommending unit 54 and the URL-to-directory recommending unit 53 respectively perform the processes shown in FIGS. 18 and 19, so that the number of recommended URLs may be restricted. The processes shown in FIGS. 18 and 19 are effective when the URL recommendation candidate extracting unit 52 performs any of the above described process examples (Nos. 1 to 4). Especially, if the URL recommendation candidate extracting unit 52 performs the process example (No. 3 or 4), a URL expected to be better can be preferentially recommended by sequentially recommending URL recommendation candidates, which are sorted with the operation of the above described step S79 or S91, in descending order in step S102 of FIG. 18 or S112 of FIG. 19. This is also applicable to a modification of the process example (No. 2) performed by the URL recommendation candidate extracting unit 52. With this modification, an operation for sorting extracted recommendation candidate URLs in descending order of the number of use times is added after the operation of the above described step S67.

The respective examples of the processes performed by the URL-to-bookmark recommending unit 54, and the URL-to-directory recommending unit 53 are explained below with reference to FIGS. 18 and 19.

FIG. 18 is a flowchart for explaining the process performed by the URL-to-directory recommending unit 53.

In this figure, a preset/preregistered "maximum number (Max) of URLs registered to a directory" is first obtained (step S101). Next, the number (c) of recommended URLs is updated (incremented by 1) (step S103), each time a URL is recommended to the side of the document directory storing unit 11 from among a URL group of recommendation candidates extracted by the URL recommendation candidate extracting unit 52 (step S102) Then, the operations of steps S102 and S103 are repeatedly performed until the "number (c) of recommended URLs" after being updated exceeds the maximum number (Max) ("No" in step S104).

On the side of the document directory storing unit 11, for example, after a directory administrator, etc. determines whether or not the recommended URLs are suitable for being registered to corresponding categories, all or some of the recommended URLs are registered to the respective categories. The registration operation of recommended URLs is not limited to this implementation. The URL-to-directory recommending unit 53 may not recommend but automatically register the URLs to the respective categories of the document directory storing unit 11.

FIG. 19 is a flowchart for explaining the process performed by the URL-to-bookmark recommending unit 54.

In this figure, a preset/pre-registered "maximum number (Max) of URLs registered to a bookmark" is first obtained (step S111). Next, the number (c) of recommended URLs is updated (incremented by 1) (step S113), each time a URL is recommended to the side of the bookmark storing unit 12 from among a URL group of recommendation candidates extracted by the URL recommendation candidate extracting unit 52 (step S112) Then, the operations of steps S112 and S113 are repeatedly performed until the "number (c) of recommended URLs" after being updated exceeds the maximum number (Max) ("NO" in step S114).

After a user or a directory administrator who receives a recommendation from the URL-to-bookmark recommending unit 54 or the URL-to-directory recommending unit 53 determines whether or not to really register the recommended URL, the user or the directory administrator registers the URL to each category. Or, the registration operation is not limited to this implementation. The URL-to-bookmark recommending unit 54 or the URL-to-directory recommending unit 53 may automatically register its recommended URL to each category.

As described above, with the URL recommending system according to this preferred embodiment, both of document directory and user sides can obtain the following effects respectively.

effects on the document directory side (1) An operation for searching for a URL to be newly registered, and for determining a suitable category to which the found URL is to be registered can be reduced for a directory administrator.

(2) The weight g of a directory is increased, so that a personalized version of the directory can be provided with ease.

effects on the user side (1) An effective URL recommendation can be received, and a bookmark does not become obsolete. Even if the number of users is small, this system fully functions.

(2) The processes are performed regardless of the hierarchical structure of categories or category names (folder names, etc.), so that an effective URL recommendation can be received even if a hierarchical structure or a category name, which is unique to a user, such as a bookmark, is used.

(3) The weight g of a directory is increased, so that a personalized version of the directory can be automatically updated.

(4) The possibility that a user can freely receive a recommendation convenient to the user itself can be increased depending on a way of setting the weight g of a directory.

Figure 20:
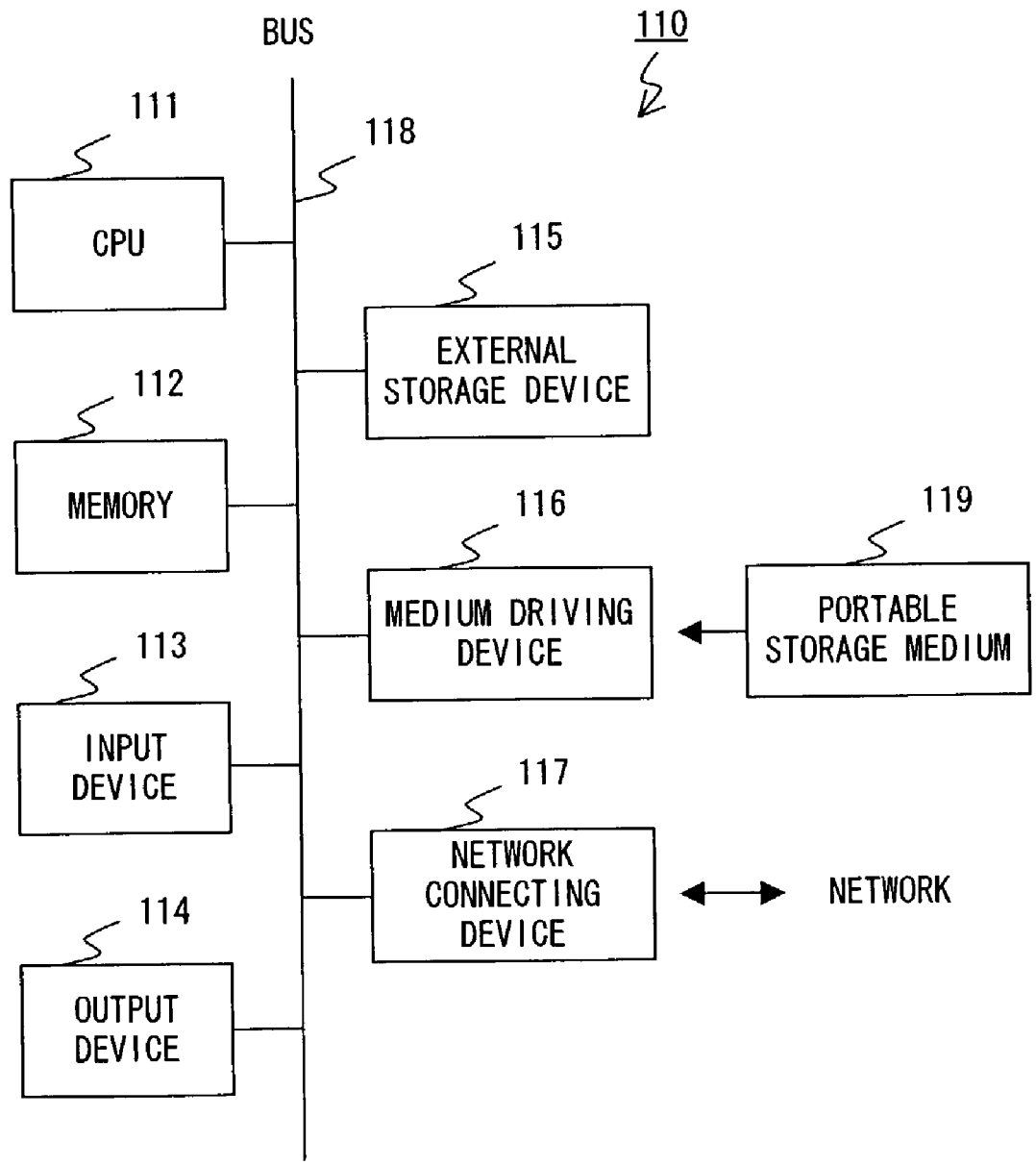
FIG. 20 exemplifies the hardware configuration of an information processing device (computer)

FIG. 20 exemplifies the hardware configuration of an information processing device (computer) that performs the above described processes.

The information processing device (computer) 110 shown in this figure comprises a CPU 111, a memory 112, an input device 113, an output device 114, an external storage device 115, a medium driving device 116, a network connecting device 117, etc., which are connected to a bus 118. The configuration shown in this figure is merely one example, and the present invention is not limited to this configuration.

The CPU 111 is a central processing unit which controls the whole of the information processing device 110.

The memory 112 is a memory such as a RAM, etc., which temporarily stores a program or data stored in the external storage device 115 (or onto a portable storage medium 119), when the program is executed, the data is updated, or the like. The CPU 111 performs the above described processes by using the program/data read into the memory 112.

The input device 113 is, for example, a keyboard, a mouse, a touch panel, etc.

The output device 114 is, for example, a display, a printer, etc.

Note that the input device 113 and the output device 114 may not be arranged.

The external storage device 115 is, for example, a hard disk device, etc., and stores a program/data, etc. for implementing the above described functions (for example, the program/data causing a computer to execute the processes represented by FIGS. 5, 6, 9 to 12, 14, 15, and 17 to 19), etc.).

The medium driving device 116 reads (or writes) the program/data, etc. from/to the portable storage medium 119. The portable storage medium 119 is, for example, an FD (Flexible Disk), a CD-ROM, a DVD, a magneto-optical disk, etc.

The network connecting device 117 makes a connection to a network (the Internet, etc.), and allows a transmission/reception of a program/data, etc. to/from an external information processing device.

FIG. 21 exemplifies storage media storing the above described program, or the downloading of the program.

As shown in this figure, the portable storage medium 119 storing the program/data implementing the functions of the present invention is inserted into the main body of the information processing device 110, so that the program/data may be read and stored in the memory 112, and executed. Additionally, the above described program/data may be a propagation signal for downloading a program/data 121 stored in a server 120 of an external program/data provider side via a network 130 (the Internet, etc.) connected by the network connecting unit 117.

Additionally, the present invention is not limited to an apparatus/method, and may be implemented as a storage medium (the portable storage medium 119, etc.) itself storing the above described program/data, or as the above described propagation signal.

As described in detail above, with the location information recommending apparatus, method, program, etc. according to the present invention, not only a bookmark but also a document directory is used, so that an effective recommendation can be received even if the number of registration users is relatively small, and the possibility that a recommended URL is helpful can be increased. Additionally, a registration operation in a document directory can be reduced, thereby saving maintenance/administration cost. Furthermore, a user can adjust a weight, which facilitates a URL recommendation in a form desired by the user. Still further, a personalized version of a document directory can be automatically updated.

What is claimed is:

1. A location information recommending apparatus, comprising:

a category comparing unit generating a plurality of category pairs, each category pair including a first bookmark or document directory belonging to a category and a second bookmark or document directory belonging to a category, and calculating a degree of similarity for each of said category pairs based on both location information associated with each category from a location information storing unit and individually registered location information from a storing unit storing individually registered location information of a plurality of users in each category;

a location information recommendation candidate extracting unit selecting a category pair whose degree of similarity is equal to or higher than a first threshold, and extracting a location information candidate to be recommended for each selected category pair; and a first recommending unit recommending, to the location information storing unit, location information to be registered to each category based on the location information candidate to be recommended for each selected category pair.

2. The location information recommending apparatus according to claim 1, wherein said location information recommendation candidate extracting unit extracts difference location information by making a comparison between the categories of each category pair, and defines the difference location information to be the location information candidate to be recommended.

3. The location information recommending apparatus according to claim 1, further comprising an access number storing unit storing a total number of accesses made to contents indicated by the location information, or a number of accesses made by each user for each location information, wherein said location information recommendation candidate extracting unit excludes location information whose number of accesses is equal to or smaller than a second threshold from the location information candidate to be recommended.

4. The location information recommending apparatus according to claim 1, wherein:
said location information recommendation candidate extracting unit assigns a priority to the extracted location information candidate to be recommended; and
said first recommending unit sequentially recommends location information, to which a higher priority has been assigned, to the location information storing unit.

5. The location information recommending apparatus according to claim 4, wherein said location information recommendation candidate extracting unit determines the priority based on a plurality of said categories, said plurality of categories including the location information candidate to be recommended.

6. The location information recommending apparatus according to claim 4, further comprising a weight adjusting unit weighting a category stored in the location information storing unit, wherein said location information recommendation candidate extracting unit determines the priority by using the weight.

7. The location information recommending apparatus according to claim 1, wherein said first recommending unit restricts a number of locations recommended to the location information storing unit or the individually registered location information storing unit to a third threshold for each category.

8. The location information recommending apparatus according to claim 1, wherein said category comparing unit defines a number of common locations to be the degree of similarity for each category pair.

9. The location information recommending apparatus according to claim 1, wherein said category comparing unit, for each category pair, obtains contents indicated by the location information associated with each category, breaks down the contents into words, obtains a number of common words, and defines the number of common words to be the degree of similarity.

10. The location information recommending apparatus according to claim 1, wherein said category comparing unit, for each category pair, obtains a keyword pre-registered for a first category of said category pair, obtains contents indicated by the location information associated with a second category of said category pair, breaks down the contents into words, obtains a number of words which match the keyword, and defines the obtained number of words to be the degree of similarity.

11. The location information recommending apparatus according to claim 1, further comprising an access number storing unit storing respectively for every set of location information a total number of accesses made to contents indicated by each set of the location information or a total number of accesses made to contents indicated by each set of the location information separately for every user, wherein said category comparing unit, for each category pair, obtains a number of accesses made to the location information included in each category from said access number storing unit, calculates an inner product/distance by using the obtained number of accesses as a vector, and defines the calculated inner product/distance to be the degree of similarity.

12. A location information recommending apparatus, comprising:
a category comparing unit generating a plurality of category pairs, each category pair including a first bookmark or document directory belonging to a category and a second bookmark or document directory belonging to a category, and calculating a degree of similarity for each of said category pairs based on both location information associated with each category from a location information storing unit and individually registered location information from a storing unit storing individually registered location information of a plurality of users in each category;
a location information recommendation candidate extracting unit selecting a category pair whose degree of similarity is equal to or higher than a first threshold, and extracting a location information candidate to be recommended for each selected category pair; and
a recommending unit recommending, to the individually registered location information storing unit, location information to be registered to each category based on the location information candidate to be recommended, for each selected category pair.

13. The location information recommending apparatus according to claim 12, wherein said location information recommendation candidate extracting unit extracts difference location information by making a comparison between the categories of each category pair, and defines the difference location information to be the location information candidate to be recommended.

14. The location information recommending apparatus according to claim 12, further comprising an access number storing unit storing a number of accesses made to contents indicated by the location information, wherein said location information recommendation candidate extracting unit excludes location information whose number of accesses is equal to or smaller than a second threshold from the location information candidate to be recommended.

15. The location information recommending apparatus according to claim 12, wherein:
said location information recommendation candidate extracting unit assigns a priority to the extracted location information candidate to be recommended; and
said recommending unit sequentially recommends location information, to which a higher priority has been assigned, to the individually registered location information storing unit.

16. A location information recommending apparatus, comprising:
category comparing means for generating a plurality of category pairs, each category pair including a first bookmark or document directory belonging to a category and a second bookmark or document directory belonging to a category, and calculating a degree of similarity for each of said category pairs based on both location information associated with each category from a location information storing unit and individually registered location information from a storing unit storing individually registered location information of a plurality of users in each category;
location information recommendation candidate extracting means for selecting a category pair whose degree of similarity is equal to or higher than a first threshold, and extracting a location information candidate to be recommended for each selected category pair; and
recommending means for recommending, to the location information storing unit or the individually registered location information storing unit, location information to be registered to each category based on the location information candidate to be recommended for each selected category pair.

17. A location information recommending method, comprising:
   generating a plurality of category pairs, each category pair including a first bookmark or document directory belonging to a category and a second bookmark or document directory belonging to a category, and calculating a degree of similarity for each of said category pairs by obtaining both location information associated with each category from a location information storing unit and individually registered location information from a storing unit storing individually registered location information of a plurality of users in each category;
   selecting a category pair whose degree of similarity is equal to or higher than a first threshold, and extracting a location information candidate to be recommended for each selected category pair; and
   recommending, to the location information storing unit or the individually registered location information storing unit, location information to be registered to each category based on the extracted location information candidate to be recommended, for each selected category pair.

18. The location information recommending method according to claim 17, further comprising:
   obtaining a number of accesses from a unit storing a number of accesses made to contents indicated by each location information; and
   excluding location information whose number of accesses is equal to or smaller than a second threshold from the location information candidate to be recommended.

19. The location information recommending method according to claim 17, further comprising:
   assigning a priority to the extracted location information candidate to be recommended, and sequentially recommending location information, to which a higher priority is assigned, to the location information storing unit or the individually registered location information storing unit in descending order of priority.

20. The location information recommending method according to claim 19, further comprising:
   weighting the categories stored in the location information storing unit set; and
   determining the priority by using the weight.

21. The location information recommending method according to claim 17, further comprising restricting a number of recommended locations to a predetermined number.

22. A computer-readable storage medium on which is recorded a program for causing a computer to execute a process, the process comprising:
   generating a plurality of category pairs, each category pair including a first bookmark or document directory belonging to a category and a second bookmark or document directory belonging to a category, and calculating a degree of similarity for each of said category pairs based on both location information associated with each category from a location information storing unit and individually registered location information from a storing unit storing individually registered location information of a plurality of users in each category;
   selecting a category pair whose degree of similarity is equal to or higher than a first threshold, and extracting a location information candidate to be recommended for each selected category pair; and
   recommending, to the location information storing unit, location information to be registered to each category based on the extracted location information candidate to be recommended, for each selected category pair.

23. The storage medium according to claim 22, the process further comprising:
   obtaining a number of accesses from a unit storing a number of accesses made to contents indicated by the location information; and
   excluding location information whose number of accesses is equal to or smaller than a second threshold from the location information candidate to be recommended.

24. The storage medium according to claim 22, the process further comprising:
   assigning a priority to the extracted location information candidate to be recommended; and
   recommending location information to the location information storing unit or the individually registered location information storing unit in a descending order of the priority.

25. The storage medium according to claim 22, the process further comprising:
   weighting the categories stored in the location information storing unit set; and
   determining the priority by using the weight.

26. The storage medium according to claim 22, the process further comprising restricting a number of the recommended locations n to a predetermined number of recommended locations.

27. A computer-readable storage medium on which is recorded a program for causing a computer to execute a process, the process comprising:
   generating a plurality of category pairs, each category pair including a first bookmark or document directory belonging to a category and a second bookmark or document directory belonging to a category, and calculating a degree of similarity for each of said category pairs based on both location information associated with each category from a location information storing unit and individually registered location information from a storing unit storing individually registered location information of a plurality of users in each category;
   selecting a category pair whose degree of similarity is equal to or higher than a first threshold, and extracting a location information candidate to be recommended for each selected category pair; and
   recommending, to the individually registered location information storing unit, location information to be registered to each category based on the extracted location information candidate to be recommended, for each selected category pair.

28. The storage medium according to claim 27, the process further comprising:
   obtaining a number of accesses from a unit storing a number of accesses made to contents indicated by location information; and
   excluding location information whose number of accesses is equal to or smaller than a second threshold from the location information candidate to be recommended.

29. The storage medium according to claim 27, the process further comprising:
   assigning a priority to the extracted location information candidate to be recommended; and
   recommending location information to the location information storing unit or the individually registered location information storing unit in descending order of the priority.

30. A computer-readable storage medium on which is recorded a program for causing a computer to execute a process, the process comprising:

generating a plurality of category pairs, each category pair including a first bookmark or document directory belonging to a category and a second bookmark or document directory belonging to a category, and calculating a degree of similarity for each of said category pairs based on both location information associated with each category from a location information storing unit and individually registered location information from a storing unit storing individually registered location information of a plurality of users in each category, so that location information can be recommended for categories whose degree of similarity is higher than a predetermined threshold.

* * * * *